United States Patent
Greenstein et al.

(10) Patent No.: US 12,440,487 B2
(45) Date of Patent: Oct. 14, 2025

(54) METHOD OF NORMALIZING THE NEUTROPHIL TO LYMPHOCYTE RATIO IN CANCER PATIENTS WITH A SELECTIVE GLUCOCORTICOID RECEPTOR ANTAGONIST

(71) Applicant: Corcept Therapeutics Incorporated, Menlo Park, CA (US)

(72) Inventors: Andrew Greenstein, Menlo Park, CA (US); Lawrence Lu, Menlo Park, CA (US); Joseph Custodio, Menlo Park, CA (US); Stacie Shepherd, Menlo Park, CA (US)

(73) Assignee: Corcept Therapeutics Incorporated, Redwood City, CA (US)

( * ) Notice: Subject to any disclaimer, the term of this patent is extended or adjusted under 35 U.S.C. 154(b) by 590 days.

(21) Appl. No.: 17/768,844

(22) PCT Filed: Oct. 14, 2020

(86) PCT No.: PCT/US2020/055498
§ 371 (c)(1),
(2) Date: Apr. 13, 2022

(87) PCT Pub. No.: WO2021/076565
PCT Pub. Date: Apr. 22, 2021

(65) Prior Publication Data
US 2024/0156807 A1 May 16, 2024

Related U.S. Application Data

(60) Provisional application No. 62/915,865, filed on Oct. 16, 2019.

(51) Int. Cl.
*A61K 31/4745* (2006.01)
*A61K 45/06* (2006.01)
*A61P 35/00* (2006.01)

(52) U.S. Cl.
CPC .......... *A61K 31/4745* (2013.01); *A61K 45/06* (2013.01); *A61P 35/00* (2018.01)

(58) Field of Classification Search
CPC ...... A61P 35/00; A61K 31/4745; A61K 45/06
See application file for complete search history.

(56) References Cited

U.S. PATENT DOCUMENTS

| | | | |
|---|---|---|---|
| 9,943,505 B2 * | 4/2018 | Hunt | A61K 31/473 |
| 10,413,540 B2 * | 9/2019 | Hunt | A61K 31/4745 |
| 2011/0269728 A1 | 11/2011 | Pan et al. | |
| 2014/0038926 A1 | 2/2014 | Hunt et al. | |
| 2014/0315866 A1 | 10/2014 | Pan et al. | |
| 2018/0280378 A1 | 10/2018 | Hunt | |
| 2019/0134004 A1 * | 5/2019 | Conzen | A61K 31/4166 |

FOREIGN PATENT DOCUMENTS

| | | |
|---|---|---|
| CN | 104619328 A | 5/2015 |
| CN | 109689044 A | 4/2019 |
| WO | 2016141365 A1 | 9/2016 |
| WO | 2017151613 A1 | 9/2017 |
| WO | 2018049255 A1 | 3/2018 |
| WO | 2018183947 A1 | 10/2018 |

OTHER PUBLICATIONS

Hanahan, Douglas, and Robert A. Weinberg. "The Hallmarks of Cancer." Cell 100, No. 1 (2000): 57-70 (Year: 2000).*
Chen et al. Cancer Research Communications 4, No. 9 (2024): 2415-2426 (Year: 2024).*
Bakour, Noor, Frank Moriarty, Gillian Moore, Tracy Robson, and Stephanie L. Annett. "Prognostic significance of glucocorticoid receptor expression in cancer: A systematic review and meta-analysis." Cancers 13, No. 7 (2021): 1649 (Year: 2021).*
Kumar, R., E. Geuna, V. Michalarea, M. Guardascione, U. Naumann, D. Lorente, S. B. Kaye, and J. S. De BoNo. "The neutrophil-lymphocyte ratio and its utilisation for the management of cancer patients in early clinical trials." British journal of cancer 112, No. 7 (2015): 1157-1165). (Year: 2015).*
International Patent Application No. PCT/US2020/055498 , International Preliminary Report on Patentability, Mailed on Apr. 28, 2022, 8 pages.
Australian Patent Application No. 2020367769 , "First Examination Report", Jun. 19, 2023, 5 pages.
Chinese Patent Application No. 202080073091.5 , "Office Action", Jul. 29, 2023, 13 pages.
Hurt et al., "Cancer-promoting mechanisms of tumor-associated neutrophils", The American journal of Surgery, vol. 214, Dec. 31, 2017, pp. 938-934.

(Continued)

*Primary Examiner* — James H Alstrum-Acevedo
*Assistant Examiner* — Carolyn L. Ladd
(74) *Attorney, Agent, or Firm* — Kilpatrick Townsend & Stockton LLP

(57) ABSTRACT

Methods for treating a cancer patient with a neutrophil-to-lymphocyte ratio (NLR) greater than 3 are disclosed, comprising administering a nonsteroidal glucocorticoid receptor antagonist (GRA) to such a cancer patient, effective to reduce the patient's NLR. The methods include administering a nonsteroidal GRA and a cancer treatment to such a cancer patient, effective to reduce the patient's NLR and enhance the treatment of the cancer patient. The GRA may be orally administered. The nonsteroidal GRA may be a nonsteroidal compound comprising a heteroaryl ketone fused azadecalin structure (e.g., relacorilant) or an octahydro fused azadecalin structure (e.g., exicorilant). The cancer treatment may include chemotherapy, immunotherapy, radiation therapy, administration of an anti-angiogenic agent, administration of a growth factor inhibitor, and surgery. The methods may enhance the cancer treatment, improve the prognosis of the cancer patient, improve the survival of the cancer patient, and provide beneficial clinical effects and advantages to the patient.

8 Claims, 7 Drawing Sheets

(56) References Cited

OTHER PUBLICATIONS

Ronchetti et al., "How Glucocorticoids Affect the Neutrophil Life", International Journal of Molecular Sciences, vol. 19, No. 12, 2018, pp. 1-12.
Hurt et al., "Cancer-promoting Mechanisms of Tumor-Associated Neutrophils", The American Journal of Surgery. vol. 214, 2017, pp. 938-944.
International Patent Application No. PCT/US2020/055498, International Search Report and Written Opinion, Mailed on Feb. 2, 2021, 11 pages.
Ronchetti et al., "How Glucocorticoids Affect the Neutrophil Life", International Journal of Molecular Sciences. vol. 19, No. 4090, 2018, pp. 1-12.
Templeton et al., "Prognostic Role of Neutrophil-to-Lymphocyte Ratio in Solid Tumors: A Systematic Review and Meta-Analysis", Journal of the National Cancer Institute. vol. 106, No. 6, 2014, pp. 1-11.
European Patent Application No. 20877594.0, "Extended European Search Report", Oct. 25, 2023, 10 pages.
Greenstein et al., "Impact of Relacorilant, a Selective Glucocorticoid Receptor Antagonist, on the Immunosuppressive Effects of Endogenous Cortisol", Journal of Clinical Oncology, vol. 38, No. 15, May 1, 2020, pp. 1-3.
Rew et al., "Discovery of a Potent and Selective Steroidal Glucocorticoid Receptor Antagonist (ORIC-101)", Journal of Medicinal Chemistry, vol. 61, No. 17, Aug. 9, 2018, pp. 7767-7784.
Japanese Patent Application No. 2022-523242, Notice of Allowance, Mailed on Jan. 21, 2025, 1 page.
West et al., "Abstract PD3-02: Second-Generation Selective Glucocorticoid Receptor Modulators in Triple-negative Breast Cancer", Cancer Research, vol. 76, No. 4, Supplement, Abstract PD3-02, Feb. 15, 2016, 4 pages.

* cited by examiner

EFFECT OF RELACORILANT ON NLR OF HEALTHY SUBJECTS

(A)

(B)

(C)

Dosing and assessment schedule for healthy subject study. (A) SAD prednisone-challenge design. (B) MAD prednisone-challenge design. (C) Figure legend A single 500 mg dose of relacorilant reversed the effects of 25 mg prednisone on the NLR Multiple 250 mg doses of relacorilant reversed the effects of prednisone compared to a prednisone alone.

250 mg relacorilant alone does not change the NLR in healthy subjects.

AUC (right) or $C_{max}$ (left) associated changes in NLR during 7 days of relacorilant alone in patients with advanced solid tumors.

In an ovarian cancer patient (038-4004) who went on to achieve complete response to relacorilant + nab-paclitaxel, NLR is reduced after 7 days of relacorilant alone.

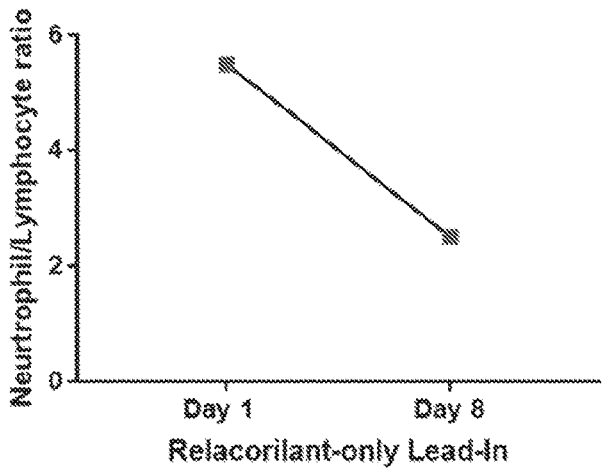

Fig. 11

NLR change from baseline ($\log_2$ scale) in patients with progressive disease (PD), stable disease (SD), and partial or complete response (PR/CR) during the first 8 (left) or 15 (right) days of cycle 1. Horizontal lines represent median values.

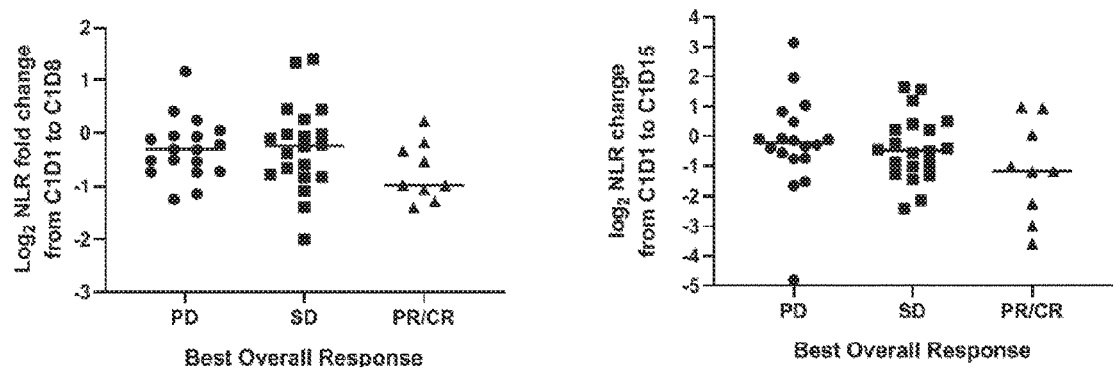

Fig. 12

METHOD OF NORMALIZING THE NEUTROPHIL TO LYMPHOCYTE RATIO IN CANCER PATIENTS WITH A SELECTIVE GLUCOCORTICOID RECEPTOR ANTAGONIST

CROSS-REFERENCE TO RELATED APPLICATIONS

This application is a 371 U.S. National Phase of PCT International Patent Application No. PCT/US2020/055498, filed on Oct. 14, 2020, which claims benefit and priority to U.S. provisional patent application No. 62/915,865, filed on Oct. 16, 2019; the disclosures of which are incorporated by reference herein in their entirety for all purposes.

BACKGROUND

Cancer is a group of varied diseases characterized by uncontrolled growth and spread of abnormal cells. Cancer is a leading cause of death in the U.S. and around the world. The pathways regulating cell division and or cellular communication become altered in cancer cells such that the effects of these regulatory mechanisms in controlling and limiting cell growth fails or is bypassed. Through successive rounds of mutation and natural selection, a group of abnormal cells, generally originating from a single mutant cell, accumulates additional mutations that provide selective growth advantage over other cells, and thus evolves into a cell type that predominates in the cell mass. As the cancer cells further evolve, some become locally invasive and then metastasize to colonize tissues other than the cancer cell's tissue of origin. This property along with the heterogeneity of the tumor cell population makes cancer a particularly difficult disease to treat and eradicate.

The ratio between the absolute count of neutrophils and the absolute count of lymphocytes is referred to as the neutrophil-to-lymphocyte ratio (NLR). The NLR is prognostic or predictive of response to chemotherapy, in multiple oncology settings (An et al., "Elevated neutrophil to lymphocyte ratio predicts survival in advanced pancreatic cancer" *Biomarkers.* 15(6):516-522, 2010; Proctor et al., "A derived neutrophil to lymphocyte ratio predicts survival in patients with cancer" *Br J Cancer.* 107(4):695-699, 2012; Xue et al., "Neutrophil-to-lymphocyte ratio for predicting palliative chemotherapy outcomes in advanced pancreatic cancer patients" *Cancer Med.* 3(2):406-15, 2014; Stotz et al., "Increased neutrophil-lymphocyte ratio is a poor prognostic factor in patients with primary operable and inoperable pancreatic cancer. *Br J Cancer"* 109(2):416-421, 2013; Teo et al., "Prognostic role of neutrophil-to-lymphocyte ratio in advanced pancreatic ductal adenocarcinoma: impact of baseline fluctuation and changes during chemotherapy" *Tumori.* 99(4):516-522, 2013; Wang et al., "Comparison of the prognostic values of various inflammation-based factors in patients with pancreatic cancer" *Med Oncol.* 29(5):3092-3100, 2012). The NLR is also predictive of response to checkpoint inhibitors, also called immuno-oncology therapeutics, such as inhibitors of PD-1 (Sacdalan et al., "Prognostic utility of baseline neutrophil-to-lymphocyte ratio in patients receiving immune checkpoint inhibitors: a review and meta-analysis" *OncoTargets and Therapy.* 11:955-65, 2018). In metastatic renal cell carcinoma patients, a reduction in NLR with cancer treatment was associated with better treatment outcome as compared to those whose NLR did not decrease (Lalani et al., *J. Immuno Therapy Cancer* 6:5 (2018)). A neutrophil-to-lymphocyte ratio below a threshold of 3 neutrophils per lymphocyte (NLR<3) is generally considered low or normal. NLR less than 3 is associated with better outcomes in multiple oncology settings. High NLR, in contrast, is associated with poorer outcomes. These systemic measurements are consistent with the roles of each cell type in tumor biology: tumor-associated neutrophils mediate tumor progression (Hurt et al. "Cancer-promoting mechanisms of tumor-associated neutrophils" *Am J Surg.* 214(5):938-944, 2017) while tumor-infiltrating lymphocytes promote tumor elimination (Mahmoud et al., "Tumor-infiltrating CD8+ lymphocytes predict clinical outcome in breast cancer" *J Clin Oncol.* 29(15):1949-55, 2011). Thus, reducing the NLR to a normal value of less than or equal to about 3 would be expected to improve outcomes in multiple oncology settings.

The glucocorticoid receptor (GR) is a nuclear hormone receptor that controls the transcription of multiple genes. GR also controls the cellular composition of blood through two described mechanisms: cell type specific apoptosis (Saffar et al., "The Molecular Mechanisms of Glucocorticoids-Mediated Neutrophil Survival" *Current Drug Targets.* 12(4):556-562, 2011) and regulation of genes involved in cellular trafficking between the margins (i.e., lymph nodes and spleen) and circulating blood (Burton et al., "Regulation of L-selectin and CD18 on bovine neutrophils by glucocorticoids: effects of cortisol and dexamethasone" *J Leukocyte Biol.* 57(2):317-25, 1995). The synthetic GR agonist dexamethasone increases circulating neutrophils and decreases circulating lymphocytes (Mishler and Emerson, "Development of Neutrophilia by serially increasing doses of dexamethasone" Br *J Hematol.* 36(2):249-57, 1977). Excessive production of the endogenous GR agonist cortisol, which is the primary etiology of Cushing's Disease, increases circulating neutrophils and decreases circulating lymphocytes (de la Balze et al., "Differential blood counts in certain adrenal cortical disorders (Cushing's syndrome, Addison's disease and panhypopituitarism)" *J Clin Endocrinol Metab.* 6:312-9, 1946; Masri-Iraqi et al., "Elevated white blood cell counts in Cushing's disease: association with hypercortisolism" *Pituitary.* 17:436-440, 2014; Tatsi et al., "Decreased lymphocytes and increased risk for infection are common in endogenous pediatric Cushing syndrome. *Pediatric Res.* 83(2):431-437, 2018). When cortisol levels are normalized (often via surgical removal a neoplastic region of the pituitary gland) in Cushing's patients, circulating neutrophils are decreased and circulating lymphocytes are increased (Masri-Iraqi, 2014). Thus, hyper-physiological GR agonism has been shown to increase the NLR.

GR-mediated signaling pathways have dynamic biologic effects involving different components of the immune system and their in vivo effects are unpredictable. For example, glucocorticoids have been reported to have both immunosuppressive effects—such as, suppression of proinflammatory cytokines, promotion of anti-inflammatory cytokines, inhibition of dendritic cells, suppression of natural killer cells, promotion of T-regulatory cells, and induction of T cell apoptosis,—and immune-enhancing effects. See Hinrichs et al., "Glucocorticoids do not inhibit antitumor activity of activated CD8+ T cells." J. Immunother. 28 (6): 517-524 (2005). The effects of GR-mediated signaling pathway on cancer cells is likewise elusive. On one hand, it is believed that activating the GR signaling pathways induce apoptosis in certain types of cancer cells, for example, malignant lymphoid cancers (see, for example, Schlossmacher et al., "Glucocorticoid receptor-mediated apoptosis: mechanisms of resistance in cancer cells" *J. Endocrinol.* 211:17-25 (2011)). On the other hand, it has also been reported that agents blocking the GR signaling pathway can potentiate chemotherapy in killing cancer cells of epithelial origin (see, e.g., U.S. Pat. No. 9,149,485).

The effects, if any, of GR antagonism on the NLR are not known. Administration of mifepristone (also known as RU-486) to healthy men does not alter the neutrophil or lymphocyte abundance in the blood (Laue, 1990). Patients with Addison's Disease often have lower than normal serum levels of cortisol; however, these patients have normal neutrophil abundance (de la Balze, "Differential blood counts in certain adrenal cortical disorders (Cushing's syndrome, Addison's disease and panhypopituitarism)" *J Clin Endocrinol Metab.* 6:312-9, 1946) and function (Bancos et al., "Primary adrenal insufficiency is associated with impaired natural killer cell function: a potential link to increased mortality" *Eur J Endocrinol.* 176(4):471-480, 2017).

Thus, the effects, if any, of GR antagonism on the NLR are not known, yet there remains need for improved cancer treatments, including treatments utilizing the prognostic value of NLR in cancer treatments.

SUMMARY

Applicant discloses herein methods of normalizing neutrophil-to-lymphocyte ratio (NLR). For cancer patients, an NLR that is higher than normal (greater than 3) is predictive of poorer prognosis. Decreasing NLR has been correlated with improved cancer treatment outcomes. Reducing the NLR in cancer patients to a normal value (i.e., less than about 3) improves the prognoses of those patients, improves their response to cancer treatment, improves the outcomes of cancer therapies, can reduce tumor load and promote tumor elimination. As noted above, mifepristone does not alter neutrophil or lymphocyte abundance in healthy subjects, and so does not affect NLR in healthy subjects (Laue, 1990). Surprisingly, as disclosed herein, administration of a nonsteroidal GRA was effective to reduce NLR in cancer patients receiving cancer treatment.

The methods disclosed herein include selecting cancer patients who have an NLR of greater than 3 and administering a nonsteroidal glucocorticoid receptor antagonist (GRA) such as, e.g., relacorilant, in combination with a cancer treatment to normalize (reduce) NLR in cancer patients with high NLR and receiving cancer treatment. The methods disclosed herein include administering a nonsteroidal GRA such as, e.g., relacorilant, in combination with a cancer treatment to treat cancer patients with high NLR. The methods disclosed herein include administering a nonsteroidal GRA such as, e.g., relacorilant, in combination with a cancer treatment to enhance the response to cancer treatment in cancer patients with high NLR and receiving cancer treatment. The methods disclosed herein include administering a nonsteroidal GRA such as, e.g., relacorilant, in combination with a cancer treatment to reduce tumor load in cancer patients having a tumor or tumors and with high NLR and receiving cancer treatment. The methods disclosed herein include administering a nonsteroidal GRA such as, e.g., relacorilant, in combination with a cancer treatment to promote tumor elimination in cancer patients with high NLR and receiving cancer treatment. The methods disclosed herein include administering a nonsteroidal GRA such as, e.g., relacorilant, in combination with a cancer treatment to improve the health of cancer patients with high NLR. The methods disclosed herein include administering a nonsteroidal GRA such as, e.g., relacorilant, in combination with a taxane, such as nab-paclitaxel, to a cancer patient with high NLR to lower the NLR, to improve the response of the patient to the taxane, and to improve the health of the cancer patient.

In embodiments, the cancer treatment may include administration of a chemotherapeutic agent (e.g., a taxane, such as nab-paclitaxel, gemcitabine, or other chemotherapeutic agent). In embodiments, the cancer treatment may include administration of an immunotherapeutic agent (e.g., a checkpoint inhibitor, such as an antibody directed to a protein target selected from PD-1, PD-L1, CTKA4, LAG3, B7-H3, B7-H4, OX-40, CD-137, and TIM3, or other immunotherapy. In embodiments, the cancer treatment may include administration of radiotherapy (e.g., direction of ionizing radiation to a tumor, infusion of a radioactive pharmaceutical composition, implantation of a radiation source, or other radiotherapy). Cancer treatment may include surgery and other cancer treatments, and may include combinations of these cancer treatments.

In embodiments of the methods disclosed herein, the nonsteroidal GRA is a nonsteroidal compound comprising a fused azadecalin structure. In embodiments, the compound comprising a fused azadecalin structure is a compound described and disclosed in U.S. Pat. Nos. 7,928,237 and 8,461,172. In embodiments, the compound comprising a heteroaryl-ketone fused azadecalin structure is a compound described and disclosed in U.S. Pat. No. 8,859,774. In embodiments, the compound comprising an octahydro fused azadecalin structure is a compound described and disclosed in U.S. Pat. No. 10,047,082. The entire contents of these patents, and all patents, patent applications, patent publications, and publications discussed herein, both supra and infra, are hereby incorporated by reference in their entireties.

In embodiments, for example, the nonsteroidal GRA is a heteroaryl-ketone fused azadecalin compound (e.g., a compound disclosed in a U.S. Pat. No. 8,859,774). In particular embodiments, the nonsteroidal GRA is (R)-(1-(4-fluorophenyl)-6-((1-methyl-1H-pyrazol-4-yl)sulfonyl)-4,4a,5,6,7,8-hexahydro-1H-pyrazolo[3,4-g]isoquinolin-4a-yl)(4-(trifluoromethyl)pyridin-2-yl)methanone, also known as "relacorilant" and as "CORT125134" (Example 18 of U.S. Pat. No. 8,859,774), which has the following structure:

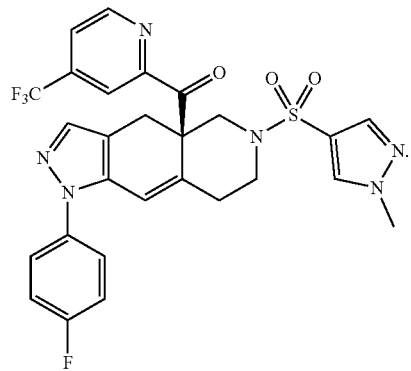 [SMILES: Cn1cc(S(=O)(=O)N2CCC3=Cc4c(cnn4-c4ccc(F)cc4)C[C@]3(C(=O)c3cc(C(F)(F)F)ccn3)C2)cn1]

Relacorilant is chemically distinct from the steroidal compound mifepristone. Unlike mifepristone, relacorilant does not antagonize the progesterone receptor. Thus relacorilant (and other fused azadecalin compounds disclosed, e.g., in U.S. Pat. Nos. 8,859,774, 7,928,237, 8,461,172, and 10,047,082 and other patents cited herein) provides a means of selectively antagonizing the glucocorticoid receptor. The effect of relacorilant on the NLR has not been described.

In some cases, the selective nonsteroidal GRA is orally administered. In some cases, the selective nonsteroidal GRA is administered by injection, infusion, transdermal application, by a nebulized suspension, or by an aerosol spray.

In some cases, the effective amount of the nonsteroidal selective GRA is a daily dose of between 1 and 100 mg/kg/day. In some embodiments, the dose of the nonsteroidal selective GRA is a daily dose of 1, 2, 4, 6, 8, 10, 12, 14, 16, 18, 20, 30, 40, 50 60, 70, 80, 90 or 100 mg/kg/day. In some cases, the GRA is administrated for at least 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80 weeks, or until the cancer becomes worse (disease progression).

The present methods provide improved methods of normalizing (reducing) NLR in cancer patients with high NLR and receiving cancer treatment; of enhancing the response to cancer treatment in cancer patients with high NLR and receiving cancer treatment (e.g., improving the response of a cancer patient with high NLR to taxane (e.g., nab-paclitaxel) chemotherapy); of reducing tumor load in cancer patients having a tumor or tumors and with high NLR and receiving cancer treatment; of promoting tumor elimination in cancer patients with high NLR and receiving cancer treatment; and improving the health of cancer patients with high NLR and receiving cancer treatment. The present methods provide advantages to patients by improving and enhancing cancer treatments, delaying disease progression, improving patient longevity and survival, quality of life, and other beneficial health outcomes.

BRIEF DESCRIPTION OF THE DRAWINGS

FIG. 11. NLR was reduced (after 7 days of relacorilant alone) in an ovarian cancer patient who then went on to achieve complete response to treatment with relacorilant+nab-paclitaxel.

FIG. 12. NLR change from baseline (loge scale) in patients with progressive disease (PD), stable disease (SD), and partial or complete response (PR/CR) during the first 8 (left) or 15 (right) days of cycle 1. Horizontal lines represent median values.

DETAILED DESCRIPTION

A. Introduction

Figure 1:
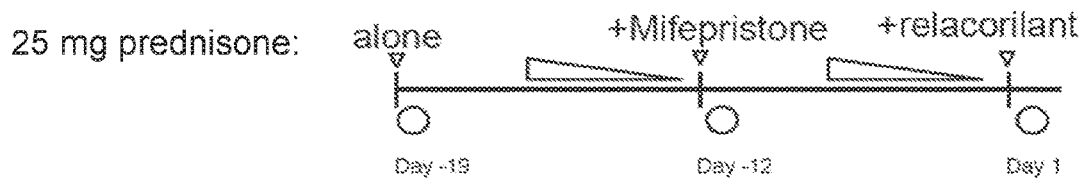
FIG. 1A. Effect of relacorilant on neutrophil-to-lymphocyte ratio (NLR) of healthy subjects. Dosing and assessment schedule for healthy subject study. (A) Single ascending dose (SAD) prednisone-challenge design.
FIG. 1B. Effect of relacorilant on neutrophil-to-lymphocyte ratio (NLR) of healthy subjects. Dosing and assessment schedule for healthy subject study. (B) Multiple ascending dose (MAD) prednisone-challenge design.
FIG. 1C. Effect of relacorilant on neutrophil-to-lymphocyte ratio (NLR) of healthy subjects. Dosing and assessment schedule for healthy subject study. (C) Figure legend.
Figure 1:
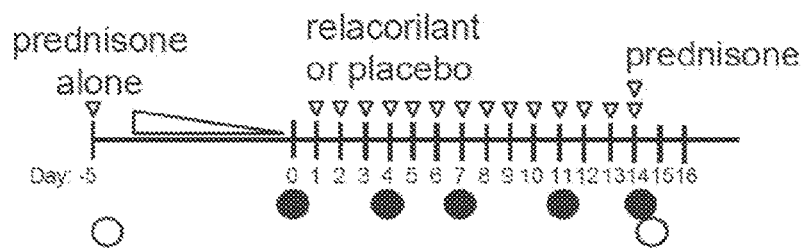
Figure 1:
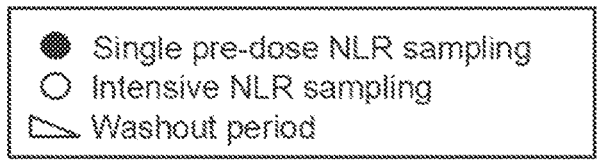

The methods disclosed herein include selecting cancer patients who have an NLR of greater than 3 and administering a nonsteroidal glucocorticoid receptor antagonist (GRA) such as, e.g., relacorilant, in combination with a cancer treatment to normalize (reduce) NLR in cancer patients with high NLR and receiving cancer treatment. Neutrophil-to-lymphocyte ratio (NLR) is typically increased in cancer patients, as compare to NLR observed in healthy individuals. A NLR of greater than 3 is excessive, and is a value often found in patients suffering from cancer. Restoring the NLR to healthier values (e.g., to about 3 or less) is indicative of beneficial response to cancer treatment. Restoring the NLR to healthier values (e.g., to about 3 or less) is correlated with improved outcome to cancer treatment as compared to cancer patients not showing normalization of NLR. It is believed that normalizing (reducing) NLR in cancer patients having NLR greater than 3 and receiving cancer treatment aids cancer treatment, improves cancer treatment outcomes, may reduce tumor load in cancer patients having a tumor or tumors, and may promote tumor elimination in cancer patients having a tumor or tumors, and otherwise aids in achieving a beneficial response to cancer treatment. Antagonism of cortisol activity by administration of a nonsteroidal selective glucocorticoid receptor antagonist (GRA), such as a heteroaryl-ketone fused azadecalin GRA, e.g., relacorilant (also termed "CORT125134" or "RELA"), in combination with cancer chemotherapy or other cancer treatment is believed to be effective in treating the cancer, and in reducing NLR values in the cancer patient to whom the treatment is administered. Applicant discloses herein that antagonism of endogenous cortisol activity correlates with response to combined treatment with relacorilant and Nab-paclitaxel (NP, or nab-pac). Applicant discloses herein that antagonism of endogenous cortisol activity correlates with response to combined treatment with relacorilant and Nab-paclitaxel.

Glucocorticoids, including endogenous cortisol, promote chemoresistance via upregulation of genes controlling cell survival pathways such as DUSP1 ("dual specificity phosphatase 1") and SGK1 ("serum/glucocorticoid regulated kinase 1") (DUSP1: accession number NM_004417.2, NSID number NM_004417.2:987; SGK1: accession number NM_005627.2, NSID number NM_005627.2:1790). Relacorilant, a nonsteroidal selective GRA, antagonizes the effects of cortisol. Relacorilant+NP achieved disease control at or after 16 weeks in 19/49 (39%) patients with refractory advanced solid tumors, including those who progressed on prior taxane, in a Phase I clinical study. Biomarkers of cortisol activity were defined following prednisone-challenge in healthy subjects and assessed in patients with solid tumors receiving relacorilant+Nab-paclitaxel.

Methods: Lymphocyte and neutrophil abundance were determined using standard differential complete blood count tests.

Results: In healthy subjects (n=9), administration of 25 milligrams (mg) of prednisone acutely increased the neutrophil-to-lymphocyte ratio (NLR) 4.7-fold. Relacorilant co-administration reversed this effect. In cancer patients, NLR was significantly elevated at baseline but was normalized by relacorilant.

These results show that relacorilant reversed the induction of NLR by prednisone in healthy subjects. Increased NLR in cancer patients was reduced by relacorilant. This is consistent with, and suggests, elevated endogenous glucocorticoid receptor (GR) activity in cancer patients.

These results show that administration of a nonsteroidal selective GRA, such as relacorilant, was effective to normalize (reduce) high NLR in cancer patients having high NLR and receiving cancer treatment. Accordingly, administration of a nonsteroidal selective GRA to cancer patients having high NLR and receiving cancer treatment can normalize (reduce) high NLR in such cancer patients and enhance the treatment of their cancer, thereby providing clinical benefit to the patients.

Thus, the present methods for treating a cancer patient with a neutrophil-to-lymphocyte ratio (NLR) greater than 3 are effective to reduce the patient's NLR and enhance the treatment of the cancer patient. In embodiments, the cancer treatment may include chemotherapy, immunotherapy, radiation therapy, administration of an anti-angiogenic agent, administration of a growth factor inhibitor, and surgery. The methods may enhance the cancer treatment, improve the prognosis of the cancer patient, delay disease progression, improve the longevity and survival of the cancer patient, improve the patient's quality of life, and provide other beneficial health outcomes, beneficial clinical effects, and other advantages to the patient.

B. Definitions

As used herein, the term "subject" or "patient" refers to a human or non-human organism. Thus, the methods and compositions described herein are applicable to both human and veterinary disease. In certain embodiments, subjects are "patients," i.e., living humans that are receiving medical care for a disease or condition. This includes persons with no defined illness who are being investigated for signs of pathology. In some cases, a subject may suffer from one or more types of cancer simultaneously. Cancers include, but are not limited to, prostate cancer, breast cancer, renal carcinoma, melanoma, pancreatic cancer, adrenocortical cancer, cervical cancer, ovarian cancer, endometrial (or uterine) cancer, vulvar cancer, colon cancer, head and neck cancer, lung cancer, sarcoma, hepatocellular tumor, glioblastoma, neuroendocrine tumor, bladder cancer, gall bladder cancer/cholangiocarcinoma, gastric cancer, and mesothelioma.

Cancers are characterized by uncontrolled growth and/or spread of abnormal cells. A biopsy is tyically taken and the cell or tissue from the biopsy is examined under a microscope in order to confirm a suspected condition. In some cases, additional tests need to be performed on the cells' proteins, DNA, and RNA to verify the diagnosis.

As used herein, the term "tumor" and the term "cancer" are used interchangeably and both refer to an abnormal growth of tissue that results from excessive cell division. A tumor that invades the surrounding tissue and/or can metastasize is referred to as "malignant." A tumor that does not metastasize is referred to as "benign."

As used herein, the term "tumor load" or "tumor burden" generally refers to the number of cancer cells, the size of a tumor, or the amount of cancer in the body in a subject at any given time. Tumor load can be detected by e.g., measuring the expression of tumor specific genetic markers and measuring tumor size by a number of well-known, biochemical or imaging methods disclosed herein, infra.

As used herein, the term "checkpoint protein" refers to a protein that is present on the surface of certain types of cells, e.g. T cells and certain tumor cells, and can induce checkpoint signaling pathways and result in modulation of immune responses. Commonly known checkpoint proteins include CTLA4, PD-1, PD-L1, LAG3, B7-H3, B7-H4, TIM3, CD160, CD244, VISTA, TIGIT, OX-40, CD137, and BTLA. (Pardoll, 2012, Nature Reviews Cancer 12:252-264; Baksh, 2015, Semin Oncol. 2015 June; 42(3):363-77). Among these, CTLA4, PD-1 and PD-L1 are most well studied and therapies targeting these proteins are more clinically advanced than therapies targeting other checkpoint proteins.

As used herein, the term "PD-1" refers to Programmed Cell Death Protein 1 (also known as CD279), a cell surface membrane protein of the immunoglobulin superfamily. PD-1 is expressed by B cells, T cells and NK cells. The major role of PD-1 is to limit the activity of T cells in peripheral tissues during inflammation in response to infection, as well as to limit autoimmunity. PD-1 expression is induced on activated T cells and binding of PD-1 to one of its endogenous ligands acts to inhibit T cell activation by inhibiting stimulatory kinases. PD-1 also acts to inhibit the TCR "stop signal". PD-1 is highly expressed on Treg cells (regulatory T cells) and may increase their proliferation in the presence of ligand (Pardoll, 2012, Nature Reviews Cancer 12:252-264).

As used herein, the term "PD-L1" refers to Programmed Cell Death 1 ligand 1 (also known as CD274 and B7-H1), a ligand for PD-1. PD-L1 is found on activated T cells, B cells, myeloid cells, macrophages, and tumor cells. Although there are two endogenous ligands for PD-1, PD-L1 and PD-L2, anti-tumor therapies have focused on anti-PD-L1. The complex of PD-1 and PD-L1 inhibits proliferation of CD8+ T cells and reduces the immune response (Topalian et al., 2012, *N. Engl J. Med.* 366:2443-54; Brahmer et al., 2012, *N. Engl J. Med.* 366:2455-65).

As used herein, the term "CTLA4" refers to Cytotoxic T-lymphocyte antigen 4 (also known as CD152), a member of the immunoglobulin superfamily that is expressed exclusively on T cells. CTLA4 acts to inhibit T cell activation and is reported to inhibit helper T cell activity and enhance regulatory T cell immunosuppressive activity. Although the precise mechanism of action of CTL4-A remains under investigation, it has been suggested that it inhibits T cell activation by outcompeting CD28 in binding to CD80 and CD86 on antigen presenting cells, as well as actively delivering inhibitor signals to the T cell (Pardoll, 2012, Nature Reviews Cancer 12:252-264).

As used herein, the term "checkpoint inhibitor" refers to any molecules, including antibodies and small molecules, that modulate the immunosuppression pathway induced by one or more checkpoint proteins. A checkpoint inhibitor is typically an antibody ("CIA") against at least one checkpoint protein. Such an antibody can block the immunosuppression activity of the checkpoint protein. A number of such antibodies have already been shown to be effective in treating cancers, e.g., antibodies against PD-1, CTLA4, and PD-L1. However, a checkpoint inhibitor may also be a small molecule, non-protein compound ("CIC") that blocks the immunosuppression pathway induced by one or more checkpoint proteins.

As used herein, the term "antibody" as used herein also includes a full-length antibody as well as an "antigen-binding portion" of an antibody. The term "antigen-binding portion", as used herein, refers to one or more fragments of an antibody that retain the ability to specifically bind to an antigen (e.g., PD-1). Examples of binding fragments encompassed within the term "antigen-binding portion" of an antibody include (i) a Fab fragment, a monovalent fragment consisting of the VL, VH, CL and CH1 domains; (ii) a F(ab')2 fragment, a bivalent fragment comprising two Fab fragments linked by a disulfide bridge at the hinge region; (iii) a Fd fragment consisting of the VH and CH1 domains; (iv) a Fv fragment consisting of the VL and VH domains of a single arm of an antibody, (v) a dAb fragment (Ward et al., (1989) Nature 341:544-546), which consists of a VH domain; and (vi) an isolated complementarity determining region (CDR). Furthermore, although the two domains of the Fv fragment, VL and VH, are coded for by separate genes, they can be joined, using recombinant methods, by a synthetic linker that enables them to be made as a single protein chain in which the VL and VH regions pair to form monovalent molecules (known as single chain Fv (scFv); see e.g., Bird et al. (1988) Science 242:423-426; and Huston et al. (1988) Proc. Natl. Acad. Sci. USA 85:5879-5883; and Osbourn et al. 1998, Nature Biotechnology 16: 778). Such single chain antibodies are also intended to be encompassed within the term "antigen-binding portion" of an antibody. Any VH and VL sequences of specific scFv can be linked to human immunoglobulin constant region cDNA or genomic sequences, in order to generate expression vectors encoding complete IgG molecules or other isotypes. VH and VI can also be used in the generation of Fab, Fv or other fragments of immunoglobulins using either protein chemistry or recombinant DNA technology. Other forms of single chain antibodies, such as diabodies are also encompassed. Diabodies are bivalent, bispecific antibodies in which VH and VL domains are expressed on a single polypeptide chain, but using a linker that is too short to allow for pairing between the two domains on the same chain, thereby forcing the domains to pair with complementary domains of another chain and creating two antigen binding sites (see e.g., Holliger, P., et al. (1993) *Proc. Natl. Acad. Sci. USA* 90:6444-6448; Poljak, R. J., et al. (1994) *Structure* 2:1121-1123).

Antibodies may be polyclonal or monoclonal; xenogeneic, allogeneic, or syngeneic; or modified forms thereof, e.g. humanized, chimeric, etc. Antibodies directed to checkpoint proteins bind specifically or substantially specifically to one or more checkpoint proteins. The term "monoclonal antibodies" refer to a population of antibody molecules that contain only one species of an antigen binding site capable of immunoreacting with a particular epitope of an antigen, whereas the term "polyclonal antibodies" and "polyclonal antibody composition" refer to a population of antibody molecules that contain multiple species of antigen binding sites capable of interacting with a particular antigen. A monoclonal antibody composition typically displays a single binding affinity for a particular antigen with which it immunoreacts.

As used herein, the term "antibody effective against a checkpoint protein" refers to an antibody that can bind to the checkpoint protein and antagonize the checkpoint protein's function in suppressing immune response. For example, an antibody against PD-1 refers to an antibody that can bind to PD-1 and block the PD-1's inhibitory function on the immune response, through e.g., blocking the interactions between PD-1 and PD-L1. In some cases, an antibody can be against two checkpoint proteins, i.e., having the ability of binding to two checkpoint proteins and inhibiting their function.

The term "neutrophil" is used herein as accepted in the medical arts, and refers to the most abundant of the granulocytes found in mammalian blood. Neutrophils are also known as neutrocytes. As part of the immune system, neutrophils phagocytose foreign cells and foreign bodies found in the blood. The cytoplasm of a neutrophil stains a neutral pink when treated with hemotaoxylin and eosin stain. Neutrophils typically have a banded or segmented nucleus.

The term "lymphocyte" is used herein as accepted in the medical arts, and refers to the white blood cells that also form the major portion of cells in the lymph. Lymphocytes include natural killer cells, T-cells, and B-cells. When a blood sample is stained with Wright's stain, lymphocytes show a large darkly stained nucleus with little eosinophilic cytoplasm.

As used herein, the terms "neutrophil-to-lymphocyte ratio" and "NLR" refers to ratio of the number of neutrophil cells divided by the number of lymphocyte cells in blood sample obtained from a subject.

NLR=(absolute neutrophil count)/(absolute lymphocyte count)

The NLR in healthy subject is generally about 3 or less. A NLR value greater than 3 is considered a high NLR value. NLR may also be expressed as a NLR percent change from baseline (% CfB) by the formula:

$$NLR\ \%\ Cfb = \frac{(NLR\ \text{at time}_2) - (NLR\ \text{at time}_1))}{(NLR\ \text{at time}_1)} \times 100$$

(where "×" indicates multiplcation)

so that, when using this formula for NLR percent change from baseline, any NLR % CfB that is less than 0% is a reduction in the NLR, and any NLR % CfB greater than 0% is an increase in NLR. The NLR may also be expressed as a NLR fold change from baseline (fold CfB) using the formula:

$$NLR\ \text{fold}\ Cfb = \frac{(NLR\ \text{at time}_2)}{(NLR\ \text{at time}_1)}$$

So that, when using this formula for NLR fold change from baseline, any NLR fold CfB that is less than 1 is a reduction in the NLR, and any NLR fold CfB that is greater than 1 is an increase in the NLR.

As used herein, the term "normalizing" NLR refers to reducing a high (greater than 3) NLR value, towards a NLR value of 3, and preferably to NLR values of 3 or less. In most preferred embodiments, the NLR is reduced to a value of less than 3.

As used herein, the term "survival" as used, e.g., with reference to patient survival, refers to the period of time after beginning treatment prior to the patient's death.

As used herein, the term "progression free survival" refers, in patients originally having a tumor, to the period of time after beginning treatment in which the tumor does not significantly grow (or "progress").

As used herein, the terms "stable response" or "stable response" refer to patients, originally having a tumor, in whom the tumors stay roughly the same size, but can include either a small amount of growth (typically less than 20 or 25%) or a small amount of shrinkage (but less shrinkage than wouls qualify as a "partial response").

As used herein, the term "partial response" (PR) refers to patients, originally having a tumor, in whom there is (roughly) at least a 50% decrease in the total tumor volume but with evidence of some residual disease still remaining. In some cases the residual disease in a deep partial response may actually be dead tumor or scar so that a few patients classified as having a PR may actually have a CR. Also many patients who show tumor shrinkage during treatment show further tumor shrinkage with continued treatment and may achieve a CR.

As used herein, the term "complete response" (CR) refers to patients, originally having a tumor, in whom all detectable tumor has disappeared as indicated by tests, physical exams and scans.

As used herein, the term "chemotherapy" refers to medical treatments typically used to treat cancer. Chemotherapy treatments include the use of agents which are toxic to cancerous tissues and cells, or which act to slow or reduce the growth or spread of cancerous tissues and cells. Chemotherapy agents include antineoplastic agents and may be derived from natural compounds (e.g., taxols); may be, may mimic, or may reduce or block the actions of naturally occurring hormones, growth factors, or immunologically active molecules; may be synthetic small molecules; may be antibodies or antibody conjugates; and may be other agents. Exemplary chemotherapy agents include, but are not limited to, taxanes, taxol, docetaxel, paclitaxel, gemcitabine, actinomycin, anthracyclines, doxorubicin, daunorubicin, valrubicin, bleomycin, cisplatin, trastuzumab (Herceptin®), trastuzumab emtasine (Kadcyla®), imatinib (Gleevec®), eribulin (Halaven®), and PARP inhibitors ("PARP" stands for pharmacological inhibitors of poly ADP ribose polymerase), among others known in the art.

As used herein, the term "compound" is used to denote a molecular moiety of unique, identifiable chemical structure. A molecular moiety ("compound") may exist in a free species form, in which it is not associated with other molecules. A compound may also exist as part of a larger aggregate, in which it is associated with other molecule(s), but nevertheless retains its chemical identity. A solvate, in which the molecular moiety of defined chemical structure ("compound") is associated with a molecule(s) of a solvent, is an example of such an associated form. A hydrate is a solvate in which the associated solvent is water. The recitation of a "compound" refers to the molecular moiety itself (of the recited structure), regardless of whether it exists in a free form or an associated form.

As used herein, the term "composition" is intended to encompass a product comprising the specified ingredients such as the said compounds, their tautomeric forms, their derivatives, their analogues, their stereoisomers, their polymorphs, their pharmaceutically acceptable salts, esters, ethers, metabolites, mixtures of isomers, their pharmaceutically acceptable solvates and pharmaceutically acceptable compositions in specified amounts, as well as any product which results, directly or indirectly, from combination of the specified ingredients in the specified amounts. Such term in relation to a pharmaceutical composition is intended to encompass a product comprising the active ingredient (s), and the inert ingredient (s) that make up the carrier, as well as any product which results, directly or indirectly, in combination, complexation or aggregation of any two or more of the ingredients, or from dissociation of one or more of the ingredients, or from other types of reactions or interactions of one or more of the ingredients. Accordingly, the pharmaceutical compositions of the present invention are meant to encompass any composition made by admixing compounds of the present invention and their pharmaceutically acceptable carriers.

As used herein, the terms "pharmaceutically acceptable excipient" and "pharmaceutically acceptable carrier" are intended to include any and all solvents, dispersion media, coatings, antibacterial and antifungal agents, isotonic and absorption delaying agents, and the like, compatible with pharmaceutical administration. The terms "pharmaceutically acceptable excipient" and "pharmaceutically acceptable carrier" refer to substances that aid the administration of an active agent to—and absorption by—a subject and can be included in the compositions of the present invention without causing a significant adverse toxicological effect on the patient. The use of such media and agents for pharmaceutically active substances is well known in the art. Except insofar as any conventional media or agent is incompatible with the active compound, use thereof in the compositions is contemplated. Supplementary active compounds can also be incorporated into the compositions. Non-limiting examples of pharmaceutically-acceptable excipients include water, NaCl, normal saline solutions, lactated Ringer's, normal sucrose, normal glucose, binders, fillers, disintegrants, lubricants, coatings, sweeteners, flavors and colors, and the like. One of ordinary skill in the art will recognize that other pharmaceutical excipients are useful in the present invention.

As used herein, the terms "administer," "administering," "administered" or "administration" refer to providing a compound or a composition to a subject or patient. Administration may be by oral administration (i.e., the subject receives the compound or composition via the mouth, as a pill, capsule, liquid, or in other form suitable for administration via the mouth. Oral administration may be buccal (where the compound or composition is held in the mouth, e.g., under the tongue, and absorbed there). Administration may be by injection, i.e., delivery of the compound or composition via a needle, microneedle, pressure injector, or other means of puncturing the skin or forcefully passing the compound or composition through the skin of the subject. Injection may be intravenous (i.e., into a vein); intraarterial (i.e., into an artery); intraperitoneal (i.e., into the peritoneum); intramuscular (i.e., into a muscle); or by other route of injection. Routes of administration may also include rectal, vaginal, transdermal, via the lungs (e.g., by inhalation), subcutaneous (e.g., by absorption into the skin from an implant containing the compound or composition), or by other route.

As used herein, the term "combination therapy" refers to the administration of at least two pharmaceutical agents to a subject to treat a disease. The two agents may be administered simultaneously, or sequentially in any order during the entire or portions of the treatment period. The at least two agents may be administered following the same or different dosing regimens. In some cases, one agent is administered following a scheduled regimen while the other agent is administered intermittently. In some cases, both agents are administered intermittently. In some embodiments, the one pharmaceutical agent, e.g., a nonsteroidal SGRA, is administered daily, and the other pharmaceutical agent, e.g., a chemotherapeutic agent, is administered every two, three, or four days.

As used herein, the term "co-administer" refers to administer two compositions simultaneously or within a short time of each other, e.g., within about within 0.5, 1, 2, 4, 6, 8, 10, 12, 16, 20, or 24 hours of each other.

As used herein, the term "effective amount" or "therapeutic amount" refers to an amount of a pharmacological agent effective to treat, eliminate, or mitigate at least one symptom of the disease being treated. In some cases, "therapeutically effective amount" or "effective amount" can refer to an amount of a functional agent or of a pharmaceutical composition useful for exhibiting a detectable therapeutic or inhibitory effect. The effect can be detected by any assay method known in the art. The effective amount can be an amount effective to provide a beneficial response in the patient. The effective amount can be an amount effective to invoke an antitumor response. The effective amount can be an amount effective to evoke a humoral and/or cellular immune response in the recipient subject leading to growth inhibition or death of target cells. For the purpose of this disclosure, the therapeutic amount of the checkpoint inhibitor is an amount that would reduce tumor load or bring about other desired beneficial clinical outcomes related to cancer improvement.

As used herein, the phrases "not otherwise indicated for treatment with a glucocorticoid receptor modulator" or "not otherwise indicated for treatment with a glucocorticoid receptor antagonist" refers to refers to a patient that is not suffering from any condition recognized by the medical community to be effectively treatable with glucocorticoid receptor antagonists, with the exception of hepatic steatosis. Conditions known in the art and accepted by the medical community to be effectively treatable with glucocorticoid receptor antagonists include: psychosis associated with interferon-α therapy, psychotic major depression, dementia, stress disorders, autoimmune disease, neural injuries, and Cushing's syndrome.

In some embodiments, the term "consisting essentially of" refers to a composition in a formulation whose only active ingredient is the indicated active ingredient, however, other compounds may be included which are for stabilizing, preserving, etc. the formulation, but are not involved directly in the therapeutic effect of the indicated active ingredient. In some embodiments, the term "consisting essentially of" can refer to compositions which contain the active ingredient and components which facilitate the release of the active ingredient. For example, the composition can contain one or more components that provide extended release of the active ingredient over time to the subject. In some embodiments, the term "consisting" refers to a composition, which contains the active ingredient and a pharmaceutically acceptable carrier or excipient.

As used herein, the terms "steroid" and "steroids", and the phrase "steroidal backbone" in the context of glucocorticoid receptor antagonists containing such refers to glucocorticoid receptor antagonists that contain modifications of the basic structure of cortisol, an endogenous steroidal glucocorticoid receptor ligand. The basic structure of a steroidal backbone is provided as Formula I:

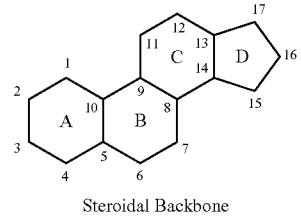

Steroidal Backbone

Formula I

The term "glucocorticosteroid" ("GC") or "glucocorticoid" refers to a steroid hormone that binds to a glucocorticoid receptor. Glucocorticosteroids are typically characterized by having 21 carbon atoms, an α,β-unsaturated ketone in ring A, and an α-ketol group attached to ring D. They differ in the extent of oxygenation or hydroxylation at C-11, C-17, and C-19; see Rawn, "Biosynthesis and Transport of Membrane Lipids and Formation of Cholesterol Derivatives," in Biochemistry, Daisy et al. (eds.), 1989, pg. 567.

A mineralocorticoid receptor (MR), also known as a type I glucocorticoid receptor (GR I), is activated by aldosterone in humans.

The term "cortisol" refers to the naturally occurring glucocorticoid hormone (also known as hydrocortisone) that is produced by the zona fasciculata of the adrenal gland. Cortisol has the structure:

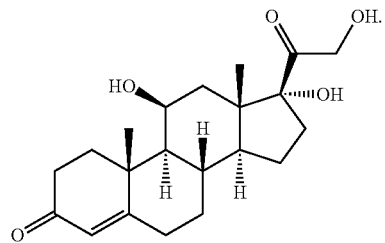

The term "mifepristone" refers to 11β-(4-dimethylaminophenyl)-17β-hydroxy -17α-(1-propynyl)-estra-4,9-dien-3-one), and has the following structure:

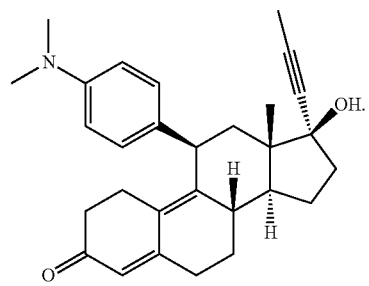

Mifepristone is also referred to as RU486, or as RU38 486, or as 17-beta-hydroxy-11-beta-(4-dimethyl-aminophenyl)-17-alpha-(1-propynyl)-estra-4,9-di+-en-3-one). Mifepristone binds to the glucocorticoid receptor (GR), the progesterone receptor (PR), the androgen receptor (AR), and is thus not selective for GR.

The term "prednisone" refers to the synthetic glucocorticoid 17α,21-dihydroxypregna-1,4-diene-3,11,20-trione, having the following structure:

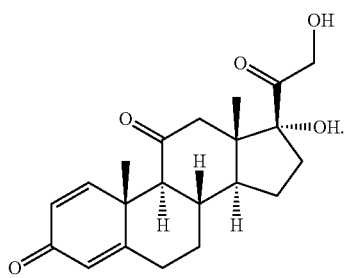

As used herein, the term "Glucocorticoid receptor" ("GR") refers to a family of intracellular receptors which specifically bind to cortisol and/or cortisol analogs. The glucocorticoid receptor is also referred to as the cortisol receptor. The term includes isoforms of GR, recombinant GR and mutated GR. "Glucocorticoid receptor" ("GR") refers to the type II GR which specifically binds to cortisol and/or cortisol analogs such as dexamethasone (See, e.g., Turner & Muller, J. Mol. Endocrinol. Oct. 1, 2005 35 283-292).

The term "glucocorticoid receptor modulator" (GRM) refers to any compound which modulates any biological response associated with the binding of GR to an agonist. For example, a GRM that acts as an agonist, such as dexamethasone, increases the activity of tyrosine aminotransferase (TAT) in HepG2 cells (a human liver hepatocellular carcinoma cell line; ECACC, UK). A GRM that acts as an antagonist, such as mifepristone, decreases the activity of tyrosine aminotransferase (TAT) in HepG2 cells.

"Glucocorticoid receptor antagonist" (GRA) refers to any compound which inhibits any biological response associated with the binding of GR to an agonist. Accordingly, GR antagonists can be identified by measuring the ability of a compound to inhibit the effect of dexamethasone. TAT activity can be measured as outlined in the literature by A. Ali et al., J. Med. Chem., 2004, 47, 2441-2452. A modulator is a compound with an $IC_{50}$ (half maximal inhibition concentration) of less than 10 micromolar. See Example 1, infra.

As used herein, the term "selective glucocorticoid receptor antagonist" (SGRA) refers to any composition or compound which inhibits any biological response associated with the binding of a GR to an agonist (where inhibition is determined with respect to the response in the absence of the compound). By "selective," the drug preferentially binds to the GR rather than other nuclear receptors, such as the progesterone receptor (PR), the mineralocorticoid receptor (MR) or the androgen receptor (AR). It is preferred that the selective glucocorticoid receptor antagonist bind GR with an affinity that is 10× greater ($1/10^{th}$ the $K_d$ value) than its affinity to the MR, AR, or PR, both the MR and PR, both the MR and AR, both the AR and PR, or to the MR, AR, and PR. In a more preferred embodiment, the selective glucocorticoid receptor antagonist binds GR with an affinity that is 100× greater ($1/100^{th}$ the $K_d$ value) than its affinity to the MR, AR, or PR, both the MR and PR, both the MR and AR, both the AR and PR, or to the MR, AR, and PR. In another embodiment, the selective glucocorticoid receptor antagonist binds GR with an affinit y that is 1000× greater ($1/1000^{th}$ the $K_d$ value) than its affinity to the MR, AR, or PR, both the MR and PR, both the MR and AR, both the AR and PR, or to the MR, AR, and PR.

As used herein, the phrase "nonsteroidal backbone" in the context of GRAs refers to GRAs that do not share structural homology to, or are not modifications of, cortisol with its steroid backbone containing seventeen carbon atoms, bonded in four fused rings. Such compounds include synthetic mimetics and analogs of proteins, including partially peptidic, pseudopeptidic and non-peptidic molecular entities.

Nonsteroidal selective GRA compounds include compounds comprising a fused azadecalin structure (which may also be termed a fused azadecalin backbone), including compounds comprising a heteroaryl-ketone fused azadecalin structure (which may also be termed a heteroaryl-ketone fused azadecalin backbone) and compounds comprising an octahydro fused azadecalin structure (which may also be termed an octahydro fused azadecalin backbone). Exemplary nonsteroidal selective GRA compounds comprising a fused azadecalin structure include those described and disclosed in U.S. Pat. Nos. 7,928,237; and 8,461,172. Exemplary nonsteroidal selective GRA compounds comprising a heteroaryl-ketone fused azadecalin structure include those described and disclosed in U.S. Pat. Nos. 8,859,774; 9,273,047; 9,707,223; and 9,956,216. Exemplary nonsteroidal selective GRA compounds comprising an octahydro fused azadecalin structure include those described and disclosed in U.S. Pat. No. 10,047,082. All patents, patent publications, and patent applications disclosed herein, both supra and infra, are hereby incorporated by reference in their entireties.

In embodiments, the heteroaryl-ketone fused azadecalin GRA is the compound (R) -(1-(4-fluorophenyl)-6-((1-methyl-1H-pyrazol-4-yl)sulfonyl)-4,4a,5,6,7,8-hexahydro-1H -pyrazolo[3,4-g]isoquinolin-4a-yl)(4-(trifluoromethyl)pyridin-2-yl)methanone (Example 18 of U.S. Pat. No. 8,859,774, also known as "relacorilant" and as "CORT125134"), which has the following structure:

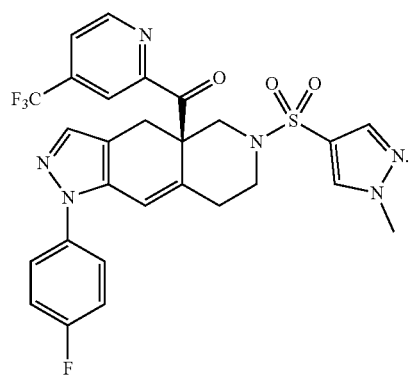 [SMILES: Cn1cc(S(=O)(=O)N2CCC3=Cc4c(cnn4-c4ccc(F)cc4)C[C@]3(C(=O)c3cc(C(F)(F)F)ccn3)C2)cn1]

In embodiments, the heteroaryl-ketone fused azadecalin GRA is the compound (R) -(1-(4-fluorophenyl)-6-((4-(trifluoromethyl)phenyl)sulfonyl)-4,4a,5,6,7,8-hexahydro-1H -pyrazolo 3,4-g]isoquinolin-4a-yl)(pyridin-2-yl)methanone (Example 1 of U.S. Pat. No. 8,859,774, termed "CORT113176"), which has the following structure:

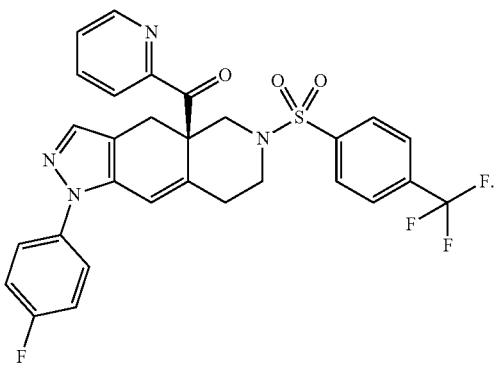 [SMILES: O=C(c1ccccn1)[C@]12Cc3cnn(-c4ccc(F)cc4)c3C=C1CCN(S(=O)(=O)c1ccc(C(F)(F)F)cc1)C2]

In embodiments, the octahydro fused azadecalin GRA is the compound ((4aR,8aS) -1-(4-fluorophenyl)-6-((2-methyl-2H-1,2,3-triazol-4-yl)sulfonyl)-4,4a,5,6,7,8,8a,9-octahydro -1H-pyrazolo[3,4-g]isoquinolin-4a-yl)(4-(trifluoromethyl)pyridin-2-yl)methanone (Example 2C of U.S. Pat. No. 10,047,082, termed "exicorilant" or "CORT125281"), which has the following structure:

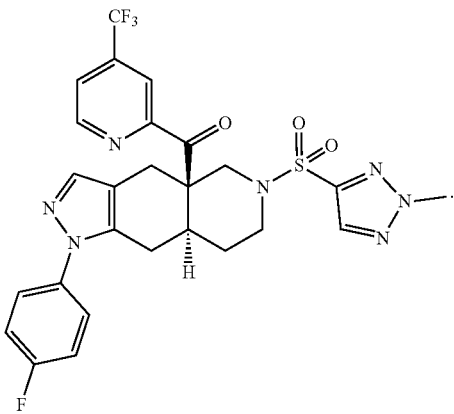 [SMILES: Cn1ncc(S(=O)(=O)N2CC[C@H]3Cc4c(cnn4-c4ccc(F)cc4)C[C@]3(C(=O)c3cc(C(F)(F)F)ccn3)C2)n1]

In embodiments, the octahydro fused azadecalin GRA is the compound ((4aR,8aS)-1-(4-fluorophenyl)-6-((2-isopropyl-2H-1,2,3-triazol-4-yl)sulfonyl) -4,4a,5,6,7,8,8a,9-octahydro-1H-pyrazolo[3,4-g]isoquinolin-4a-yl)(thiazol-4-yl)methanone* (Example 2AJ of U.S. Pat. No. 10,047,082, termed "CORT125329"), which has the following structure:

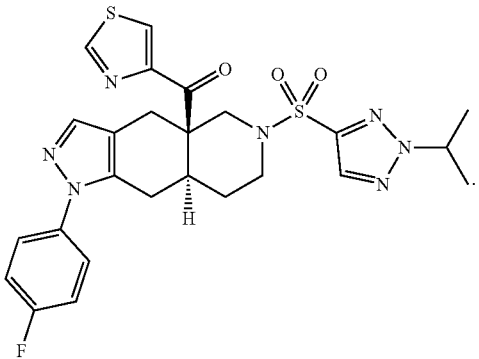 [SMILES: CC(C)n1ncc(S(=O)(=O)N2CC[C@H]3Cc4c(cnn4-c4ccc(F)cc4)C[C@]3(C(=O)c3cscn3)C2)n1]

Descriptions of compounds of the present invention are limited by principles of chemical bonding known to those skilled in the art. Accordingly, where a group may be substituted by one or more of a number of substituents, such substitutions are selected so as to comply with principles of chemical bonding and to produce compounds which are not inherently unstable—and/or would be known to one of ordinary skill in the art as likely to be unstable under ambient conditions—such as aqueous, neutral, or physiological conditions.

C. Glucocorticoid Receptor Antagonists (Gras)

Generally, normalization of NLR in a cancer patient having high NLR and receiving cancer treatment can be effected by administering an effective amount of a nonsteroidal selective glucocorticoid receptor antagonist (GRA) of any chemical structure or mechanism of action.

Exemplary nonsteroidal selective GRAs comprising a heteroaryl ketone fused azadecalin structure include those described in U.S. Pat. No. 8,859,774, which can be prepared as disclosed therein, and is incorporated herein in its entirety. Such exemplary GRAs may be SGRAs. In some cases, the GRA comprising a heteroaryl ketone fused azadecalin structure has the following structure:

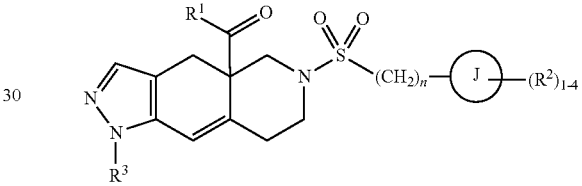

wherein
- $R^1$ is a heteroaryl ring having from 5 to 6 ring members and from 1 to 4 heteroatoms each independently selected from the group consisting of N, O and S, optionally substituted with 1-4 groups each independently selected from $R^{1a}$;
- each $R^{1a}$ is independently selected from the group consisting of hydrogen, $C_{1-6}$ alkyl, halogen, $C_{1-6}$ haloalkyl, $C_{1-6}$ alkoxy, $C_{1-6}$ haloalkoxy, —CN, N-oxide, $C_{3-8}$ cycloalkyl, and $C_{3-8}$ heterocycloalkyl;
- ring J is selected from the group consisting of a cycloalkyl ring, a heterocycloalkyl ring, an aryl ring and a heteroaryl ring, wherein the heterocycloalkyl and heteroaryl rings have from 5 to 6 ring members and from 1 to 4 heteroatoms each independently selected from the group consisting of N, O and S;
- each $R^2$ is independently selected from the group consisting of hydrogen, $C_{1-6}$ alkyl, halogen, $C_{1-6}$ haloalkyl, $C_{1-6}$ alkoxy, $C_{1-6}$ haloalkoxy, $C_{1-6}$ alkyl-$C_{1-6}$ alkoxy, —CN, —OH, —$NR^{2a}R^{2b}$, —$C(O)R^{2a}$, —$C(O)R^{2a}$, —$C(O)NR^{2a}R^{2b}$, —$SR^{2a}$, —$S(O)R^{2a}$, —$S(O)_2R^{2a}$, $C_{3-8}$ cycloalkyl, and $C_{3-8}$ heterocycloalkyl, wherein the heterocycloalkyl groups are optionally substituted with 1-4 $R^{2c}$ groups;
- alternatively, two $R^2$ groups linked to the same carbon are combined to form an oxo group (=O);
- alternatively, two $R^2$ groups are combined to form a heterocycloalkyl ring having from 5 to 6 ring members and from 1 to 3 heteroatoms each independently selected from the group consisting of N, O and S, wherein the heterocycloalkyl ring is optionally substituted with from 1 to 3 $R^{2d}$ groups;

R²ᵃ and R²ᵇ are each independently selected from the group consisting of hydrogen and C₁₋₆ alkyl;

each R²ᶜ is independently selected from the group consisting of hydrogen, halogen, hydroxy, C₁₋₆ alkoxy, C₁₋₆ haloalkoxy, —CN, and —NR²ᵃR²ᵇ;

each R²ᵈ is independently selected from the group consisting of hydrogen and C₁₋₆ alkyl, or two R²ᵈ groups attached to the same ring atom are combined to form (=O);

R³ is selected from the group consisting of phenyl and pyridyl, each optionally substituted with 1-4 R³ᵃ groups;

each R³ᵃ is independently selected from the group consisting of hydrogen, halogen, and C₁₋₆ haloalkyl; and subscript n is an integer from 0 to 3;

or salts and isomers thereof.

Exemplary nonsteroidal selective GRAs comprising an octahydro fused azadecalin structure include those described in U.S. Pat. No. 10,047,082, which can be prepared as disclosed therein, and is incorporated herein in its entirety. Such exemplary GRAs may be SGRAs. In some cases, the GRA comprising an octahydro fused azadecalin structure has the following structure:

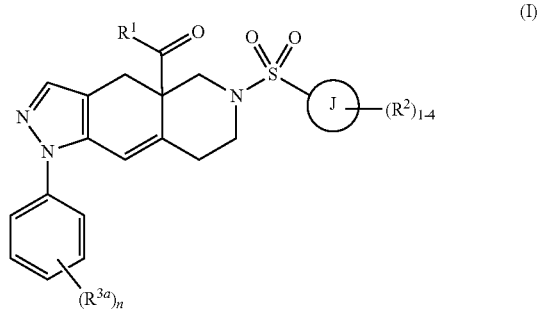

(I)

wherein

R¹ is selected from the group consisting of pyridine and thiazole, optionally substituted with 1-4 groups each independently selected from R¹ᵃ;

each R¹ᵃ is independently selected from the group consisting of hydrogen, C₁₋₆ alkyl, halogen, C₁₋₆ haloalkyl, C₁₋₆ alkoxy, C₁₋₆ haloalkoxy, N-oxide, and C₃₋₈ cycloalkyl;

ring J is selected from the group consisting of phenyl, pyridine, pyrazole, and triazole;

each R² is independently selected from the group consisting of hydrogen, C₁₋₆ alkyl, halogen, C₁₋₆ haloalkyl, and —CN;

R³ᵃ is F;

subscript n is an integer from 0 to 3;

or salts and isomers thereof.

D. Identifying Selective Glucocorticoid Receptor Antagonists

To determine whether a nonsteroidal test compound is a nonsteroidal selective GRA (nonsteroidal SGRA), the compound is first subjected to assays to measure its ability to bind to the GR and inhibit GR-mediated activities, which determines whether the compound is a glucocorticoid receptor antagonist. The compound, if confirmed to be a glucocorticoid receptor antagonist, is then subjected to a selectivity test to determine whether the compound can bind specifically to GR as compared to non GR proteins, such as the estrogen receptor, the progesterone receptor, the androgen receptor, or the mineralocorticoid receptor. In one embodiment, a SGRA binds to GR at a substantially higher affinity, e.g., at least 10 times higher affinity, than to non-GR proteins. A SGRA may exhibit a 100-fold, 1000-fold or greater selectivity for binding to GR relative to binding to non-GR proteins.

i. Binding

A test compounds' ability to bind to the glucocorticoid receptor can be measured using a variety of assays, for example, by screening for the ability of the test compound to compete with a glucocorticoid receptor ligand, such as dexamethasone, for binding to the glucocorticoid receptor. Those of skill in the art will recognize that there are a number of ways to perform such competitive binding assays. In some embodiments, the glucocorticoid receptor is pre-incubated with a labeled glucocorticoid receptor ligand and then contacted with a test compound. This type of competitive binding assay may also be referred to herein as a binding displacement assay. A decrease of the quantity of labeled ligand bound to glucocorticoid receptor indicates that the test compound binds to the glucocorticoid receptor. In some cases, the labeled ligand is a fluorescently labeled compound (e.g., a fluorescently labeled steroid or steroid analog). Alternatively, the binding of a test compound to the glucocorticoid receptor can be measured directly with a labeled test compound. This latter type of assay is called a direct binding assay.

Both direct binding assays and competitive binding assays can be used in a variety of different formats. The formats may be similar to those used in immunoassays and receptor binding assays. For a description of different formats for binding assays, including competitive binding assays and direct binding assays, see *Basic and Clinical Immunology* 7th Edition (D. Stites and A. Terr ed.) 1991; *Enzyme Immunoassay*, E.T. Maggio, ed., CRC Press, Boca Raton, Florida (1980); and "Practice and Theory of Enzyme Immunoassays," P. Tijssen, *Laboratory Techniques in* Biochemistry *and Molecular Biology*, Elsevier Science Publishers B.V. Amsterdam (1985), each of which is incorporated herein by reference.

In solid phase competitive binding assays, for example, the sample compound can compete with a labeled analyte for specific binding sites on a binding agent bound to a solid surface. In this type of format, the labeled analyte can be a glucocorticoid receptor ligand and the binding agent can be glucocorticoid receptor bound to a solid phase. Alternatively, the labeled analyte can be labeled glucocorticoid receptor and the binding agent can be a solid phase glucocorticoid receptor ligand. The concentration of labeled analyte bound to the capture agent is inversely proportional to the ability of a test compound to compete in the binding assay.

Alternatively, the competitive binding assay may be conducted in the liquid phase, and any of a variety of techniques known in the art may be used to separate the bound labeled protein from the unbound labeled protein. For example, several procedures have been developed for distinguishing between bound ligand and excess bound ligand or between bound test compound and the excess unbound test compound. These include identification of the bound complex by sedimentation in sucrose gradients, gel electrophoresis, or gel isoelectric focusing; precipitation of the receptor-ligand complex with protamine sulfate or adsorption on hydroxylapatite; and the removal of unbound compounds or ligands by adsorption on dextran-coated charcoal (DCC) or binding to immobilized antibody. Following separation, the amount of bound ligand or test compound is determined.

Alternatively, a homogenous binding assay may be performed in which a separation step is not needed. For example, a label on the glucocorticoid receptor may be altered by the binding of the glucocorticoid receptor to its ligand or test compound. This alteration in the labeled glucocorticoid receptor results in a decrease or increase in the signal emitted by label, so that measurement of the label at the end of the binding assay allows for detection or quantitation of the glucocorticoid receptor in the bound state. A wide variety of labels may be used. The component may be labeled by any one of several methods. Useful radioactive labels include those incorporating $^3$H, $^{125}$I, $^{35}$S, $^{14}$C, or $^{32}$P. Useful non-radioactive labels include those incorporating fluorophores, chemiluminescent agents, phosphorescent agents, electrochemiluminescent agents, and the like. Fluorescent agents are especially useful in analytical techniques that are used to detect shifts in protein structure such as fluorescence anisotropy and/or fluorescence polarization. The choice of label depends on sensitivity required, ease of conjugation with the compound, stability requirements, and available instrumentation. For a review of various labeling or signal producing systems which may be used, see U.S. Pat. No. 4,391,904, which is incorporated herein by reference in its entirety for all purposes. The label may be coupled directly or indirectly to the desired component of the assay according to methods well known in the art. In some cases, a test compound is contacted with a GR in the presence of a fluorescently labeled ligand (e.g., a steroid or steroid analog) with a known affinity for the GR, and the quantity of bound and free labeled ligand is estimated by measuring the fluorescence polarization of the labeled ligand.

ii. Activity

1) HepG2 Tyrosine Aminotransferase (TAT) Assay

Compounds that have demonstrated the desired binding affinity to GR are tested for their activity in inhibiting GR mediated activities. The compounds are typically subject to a Tyrosine Aminotransferase Assay (TAT assay), which assesses the ability of a test compound to inhibit the induction of tyrosine aminotransferase activity by dexamethasone. See Example 1. GR modulators that are suitable for the method disclosed herein have an $IC_{50}$ (half maximal inhibition concentration) of less than 10 micromolar. Other assays, including but not limited to those described below, can also be deployed to confirm the GR modulation activity of the compounds.

2) Cell-Based Assays

Cell-based assays which involve whole cells or cell fractions containing glucocorticoid receptors can also be used to assay for a test compound's binding or modulation of activity of the glucocorticoid receptor. Exemplary cell types that can be used according to the methods disclosed herein include, e.g., any mammalian cells including leukocytes such as neutrophils, monocytes, macrophages, eosinophils, basophils, mast cells, and lymphocytes, such as T cells and B cells, leukemia cells, Burkitt's lymphoma cells, tumor cells (including mouse mammary tumor virus cells), endothelial cells, fibroblasts, cardiac cells, muscle cells, breast tumor cells, ovarian cancer carcinomas, cervical carcinomas, glioblastomas, liver cells, kidney cells, and neuronal cells, as well as fungal cells, including yeast. Cells can be primary cells or tumor cells or other types of immortal cell lines. Of course, the glucocorticoid receptor can be expressed in cells that do not express an endogenous version of the glucocorticoid receptor.

In some cases, fragments of the glucocorticoid receptor, as well as protein fusions, can be used for screening. When molecules that compete for binding with the glucocorticoid receptor ligands are desired, the GR fragments used are fragments capable of binding the ligands (e.g., dexamethasone). Alternatively, any fragment of GR can be used as a target to identify molecules that bind the glucocorticoid receptor. Glucocorticoid receptor fragments can include any fragment of, e.g., at least 20, 30, 40, 50 amino acids up to a protein containing all but one amino acid of glucocorticoid receptor.

In some embodiments, a reduction in signaling triggered by glucocorticoid receptor activation is used to identify glucocorticoid receptor antagonists. Signaling activity of the glucocorticoid receptor can be determined in many ways. For example, downstream molecular events can be monitored to determine signaling activity. Downstream events include those activities or manifestations that occur as a result of stimulation of a glucocorticoid receptor. Exemplary downstream events useful in the functional evaluation of transcriptional activation and antagonism in unaltered cells include upregulation of a number of glucocorticoid response element (GRE)-dependent genes (PEPCK, tyrosine amino transferase, aromatase). In addition, specific cell types susceptible to GR activation may be used, such as osteocalcin expression in osteoblasts which is downregulated by glucocorticoids; primary hepatocytes which exhibit glucocorticoid mediated upregulation of PEPCK and glucose-6-phosphate (G-6-Pase)). GRE-mediated gene expression has also been demonstrated in transfected cell lines using well-known GRE-regulated sequences (e.g., the mouse mammary tumor virus promoter (MMTV) transfected upstream of a reporter gene construct). Examples of useful reporter gene constructs include luciferase (luc), alkaline phosphatase (ALP) and chloramphenicol acetyl transferase (CAT). The functional evaluation of transcriptional repression can be carried out in cell lines such as monocytes or human skin fibroblasts. Useful functional assays include those that measure IL-1beta stimulated IL-6 expression; the downregulation of collagenase, cyclooxygenase-2 and various chemokines (MCP-1, RANTES); LPS stimulated cytokine release, e.g., TNFα; or expression of genes regulated by NFkB or AP-1 transcription factors in transfected cell-lines.

Compounds that are tested in whole-cell assays can also be tested in a cytotoxicity assay. Cytotoxicity assays are used to determine the extent to which a perceived effect is due to non-glucocorticoid receptor binding cellular effects. In an exemplary embodiment, the cytotoxicity assay includes contacting a constitutively active cell with the test compound. Any decrease in cellular activity indicates a cytotoxic effect.

3) Additional Assays

Further illustrative of the many assays which can be used to identify compositions utilized in the methods disclosed herein, are assays based on glucocorticoid activities in vivo. For example, assays that assess the ability of a putative GR modulator to inhibit uptake of 3H-thymidine into DNA in cells which are stimulated by glucocorticoids can be used.

Alternatively, the putative GR modulator can complete with 3H-dexamethasone for binding to a hepatoma tissue culture GR (see, e.g., Choi, et al., *Steroids* 57:313-318, 1992). As another example, the ability of a putative GR modulator to block nuclear binding of 3H-dexamethasone-GR complex can be used (Alexandrova et al., J. *Steroid Biochem. Mol. Biol.* 41:723-725, 1992). To further identify putative GR modulators, kinetic assays able to discriminate between glucocorticoid agonists and modulators by means of receptor-binding kinetics can also be used (as described in Jones, *Biochem J.* 204:721-729, 1982).

In another illustrative example, the assay described by Daune, Molec. Pharm. 13:948-955, 1977; and in U.S. Pat. No. 4,386,085, can be used to identify anti-glucocorticoid activity. Briefly, the thymocytes of adrenalectomized rats are incubated in nutritive medium containing dexamethasone with the test compound (the putative GR modulator) at varying concentrations. $^3$H-uridine is added to the cell culture, which is further incubated, and the extent of incorporation of radiolabel into polynucleotide is measured. Glucocorticoid agonists decrease the amount of $^3$H-uridine incorporated. Thus, a GR modulator will oppose this effect.

iii. Selectivity

The GR antagonists selected above are then subject to a selectivity assay to determine whether they are SGRAs. Typically, selectivity assays include testing a compound that binds glucocorticoid receptor in vitro for the degree of binding to non-glucocorticoid receptor proteins. Selectivity assays may be performed in vitro or in cell-based systems, as described above. Binding may be tested against any appropriate non-glucocorticoid receptor protein, including antibodies, receptors, enzymes, and the like. In an exemplary embodiment, the non-glucocorticoid receptor binding protein is a cell-surface receptor or nuclear receptor. In another exemplary embodiment, the non-glucocorticoid receptor protein is a steroid receptor, such as estrogen receptor, progesterone receptor, androgen receptor, or mineralocorticoid receptor.

The selectivity of the antagonist for the GR relative to the MR can be measured using a variety of assays known to those of skill in the art. For example, specific antagonists can be identified by measuring the ability of the antagonist to bind to the GR compared to the MR (see, e.g., U.S. Pat. Nos. 5,606,021; 5,696,127; 5,215,916; 5,071,773). Such an analysis can be performed using either a direct binding assay or by assessing competitive binding to the purified GR or MR in the presence of a known ligand. In an exemplary assay, cells that stably express the glucocorticoid receptor or mineralocorticoid receptor (see, e.g., U.S. Pat. No. 5,606, 021) at high levels are used as a source of purified receptor. The affinity of the ligand for the receptor is then directly measured. Those GR modulators that exhibit at least a 10-fold, 100-fold higher affinity, often 1000-fold, for the GR relative to the MR are then selected for use in the methods disclosed herein.

The selectivity assay may also include assaying the ability to inhibit GR-mediated activities, but not MR-mediated activities. One method of identifying such a GR-specific modulator is to assess the ability of an antagonist to prevent activation of reporter constructs using transfection assays (see, e.g., Bocquel et al, J. Steroid Biochem Molec. Biol. 45:205-215, 1993; U.S. Pat. Nos. 5,606,021, 5,929,058). In an exemplary transfection assay, an expression plasmid encoding the receptor and a reporter plasmid containing a reporter gene linked to receptor-specific regulatory elements are cotransfected into suitable receptor-negative host cells. The transfected host cells are then cultured in the presence and absence of a hormone, such as cortisol or an analog thereof, able to activate the hormone responsive promoter/enhancer element of the reporter plasmid. Next the transfected and cultured host cells are monitored for induction (i.e., the presence) of the product of the reporter gene sequence. Finally, the expression and/or steroid binding-capacity of the hormone receptor protein (coded for by the receptor DNA sequence on the expression plasmid and produced in the transfected and cultured host cells), is measured by determining the activity of the reporter gene in the presence and absence of an antagonist. The antagonist activity of a compound may be determined in comparison to known antagonists of the GR and MR receptors (see, e.g., U.S. Pat. No. 5,696,127). Efficacy is then reported as the percent maximal response observed for each compound relative to a reference antagonist compound. GR modulators that exhibits at least a 100-fold, often 1000-fold or greater, activity towards the GR relative to the MR, PR, or AR are then selected for use in the methods disclosed herein.

D. Pharmaceutical Compositions and Administration

In embodiments, the present invention provides a pharmaceutical composition for normalizing NLR in cancer patients having high NLR and receiving cancer treatment, the pharmaceutical composition including a pharmaceutically acceptable excipient and a GRA. In some embodiments, the pharmaceutical composition includes a pharmaceutically acceptable excipient and a SGRA. In preferred embodiments, the pharmaceutical composition includes a pharmaceutically acceptable excipient and a nonsteroidal SGRA.

Nonsteroidal SGRAs can be prepared and administered in a wide variety of oral, parenteral and topical dosage forms. Oral preparations include tablets, pills, powder, dragees, capsules, liquids, lozenges, gels, syrups, slurries, suspensions, etc., suitable for ingestion by the patient. Nonsteroidal SGRAs can also be administered by injection, that is, intravenously, intramuscularly, intracutaneously, subcutaneously, intraduodenally, or intraperitoneally. Also, nonsteroidal SGRAs can be administered by inhalation, for example, intranasally. Additionally, nonsteroidal SGRAs can be administered transdermally. Accordingly, the present invention also provides pharmaceutical compositions including a pharmaceutically acceptable carrier or excipient and a nonsteroidal SGRA.

For preparing pharmaceutical compositions from nonsteroidal SGRAs, pharmaceutically acceptable carriers can be either solid or liquid. Solid form preparations include powders, tablets, pills, capsules, cachets, suppositories, and dispersible granules. A solid carrier can be one or more substances, which may also act as diluents, flavoring agents, binders, preservatives, tablet disintegrating agents, or an encapsulating material. Details on techniques for formulation and administration are well described in the scientific and patent literature, see, e.g., the latest edition of Remington's Pharmaceutical Sciences, Mack Publishing Co, Easton PA ("Remington's").

In powders, the carrier is a finely divided solid, which is in a mixture with the finely divided active component, a nonsteroidal SGRA. In tablets, the active component is mixed with the carrier having the necessary binding properties in suitable proportions and compacted in the shape and size desired.

The powders and tablets preferably contain from 5% or 10% to 70% of the active compound. Suitable carriers are magnesium carbonate, magnesium stearate, talc, sugar, lactose, pectin, dextrin, starch, gelatin, tragacanth, methylcellulose, sodium carboxymethylcellulose, a low melting wax, cocoa butter, and the like. The term "preparation" is intended to include the formulation of the active compound with encapsulating material as a carrier providing a capsule in which the active component with or without other carriers, is surrounded by a carrier, which is thus in association with it. Similarly, cachets and lozenges are included. Tablets, powders, capsules, pills, cachets, and lozenges can be used as solid dosage forms suitable for oral administration.

Suitable solid excipients are carbohydrate or protein fillers include, but are not limited to sugars, including lactose, sucrose, mannitol, or sorbitol; starch from corn, wheat, rice, potato, or other plants; cellulose such as methyl cellulose, hydroxypropylmethyl-cellulose, or sodium carboxymethylcellulose; and gums including arabic and tragacanth; as well as proteins such as gelatin and collagen. If desired, disintegrating or solubilizing agents may be added, such as the cross-linked polyvinyl pyrrolidone, agar, alginic acid, or a salt thereof, such as sodium alginate.

Dragee cores are provided with suitable coatings such as concentrated sugar solutions, which may also contain gum arabic, talc, polyvinylpyrrolidone, carbopol gel, polyethylene glycol, and/or titanium dioxide, lacquer solutions, and suitable organic solvents or solvent mixtures. Dyestuffs or pigments may be added to the tablets or dragee coatings for product identification or to characterize the quantity of active compound (i.e., dosage). Pharmaceutical preparations disclosed herein can also be used orally using, for example, push-fit capsules made of gelatin, as well as soft, sealed capsules made of gelatin and a coating such as glycerol or sorbitol. Push-fit capsules can contain GR modulator mixed with a filler or binders such as lactose or starches, lubricants such as talc or magnesium stearate, and, optionally, stabilizers. In soft capsules, the GR modulator compounds may be dissolved or suspended in suitable liquids, such as fatty oils, liquid paraffin, or liquid polyethylene glycol with or without stabilizers.

Liquid form preparations include solutions, suspensions, and emulsions, for example, water or water/propylene glycol solutions. For parenteral injection, liquid preparations can be formulated in solution in aqueous polyethylene glycol solution.

Aqueous solutions suitable for oral use can be prepared by dissolving the active component in water and adding suitable colorants, flavors, stabilizers, and thickening agents as desired. Aqueous suspensions suitable for oral use can be made by dispersing the finely divided active component in water with viscous material, such as natural or synthetic gums, resins, methylcellulose, sodium carboxymethylcellulose, hydroxypropylmethylcellulose, sodium alginate, polyvinylpyrrolidone, gum tragacanth and gum acacia, and dispersing or wetting agents such as a naturally occurring phosphatide (e.g., lecithin), a condensation product of an alkylene oxide with a fatty acid (e.g., polyoxyethylene stearate), a condensation product of ethylene oxide with a long chain aliphatic alcohol (e.g., heptadecaethylene oxycetanol), a condensation product of ethylene oxide with a partial ester derived from a fatty acid and a hexitol (e.g., polyoxyethylene sorbitol mono-oleate), or a condensation product of ethylene oxide with a partial ester derived from fatty acid and a hexitol anhydride (e.g., polyoxyethylene sorbitan mono-oleate). The aqueous suspension can also contain one or more preservatives such as ethyl or n-propyl p-hydroxybenzoate, one or more coloring agents, one or more flavoring agents and one or more sweetening agents, such as sucrose, aspartame or saccharin. Formulations can be adjusted for osmolarity.

Also included are solid form preparations, which are intended to be converted, shortly before use, to liquid form preparations for oral administration. Such liquid forms include solutions, suspensions, and emulsions. These preparations may contain, in addition to the active component, colorants, flavors, stabilizers, buffers, artificial and natural sweeteners, dispersants, thickeners, solubilizing agents, and the like.

Oil suspensions can be formulated by suspending a non-steroidal SGRA in a vegetable oil, such as arachis oil, olive oil, sesame oil or coconut oil, or in a mineral oil such as liquid paraffin; or a mixture of these. The oil suspensions can contain a thickening agent, such as beeswax, hard paraffin or cetyl alcohol. Sweetening agents can be added to provide a palatable oral preparation, such as glycerol, sorbitol or sucrose. These formulations can be preserved by the addition of an antioxidant such as ascorbic acid. As an example of an injectable oil vehicle, see Minto, *J. Pharmacol. Exp. Ther.* 281:93-102, 1997. The pharmaceutical formulations disclosed herein can also be in the form of oil-in-water emulsions. The oily phase can be a vegetable oil or a mineral oil, described above, or a mixture of these. Suitable emulsifying agents include naturally-occurring gums, such as gum acacia and gum tragacanth, naturally occurring phosphatides, such as soybean lecithin, esters or partial esters derived from fatty acids and hexitol anhydrides, such as sorbitan mono-oleate, and condensation products of these partial esters with ethylene oxide, such as polyoxyethylene sorbitan mono-oleate. The emulsion can also contain sweetening agents and flavoring agents, as in the formulation of syrups and elixirs. Such formulations can also contain a demulcent, a preservative, or a coloring agent.

Nonsteroidal SGRAs can be delivered by transdermally, by a topical route, formulated as applicator sticks, solutions, suspensions, emulsions, gels, creams, ointments, pastes, jellies, paints, powders, and aerosols.

Nonsteroidal SGRAs can also be delivered as microspheres for slow release in the body. For example, microspheres can be administered via intradermal injection of drug-containing microspheres, which slowly release subcutaneously (see Rao, *J. Biomater Sci. Polym. Ed.* 7:623-645, 1995; as biodegradable and injectable gel formulations (see, e.g., Gao *Pharm. Res.* 12:857-863, 1995); or, as microspheres for oral administration (see, e.g., Eyles, *J. Pharm. Pharmacol.* 49:669-674, 1997). Both transdermal and intradermal routes afford constant delivery for weeks or months.

The pharmaceutical formulations disclosed herein can be provided as a salt and can be formed with many acids, including but not limited to hydrochloric, sulfuric, acetic, lactic, tartaric, malic, succinic, etc. Salts tend to be more soluble in aqueous or other protonic solvents that are the corresponding free base forms. In other cases, the preparation may be a lyophilized powder in 1 mM-50 mM histidine, 0.1%-2% sucrose, 2%-7% mannitol at a pH range of 4.5 to 5.5, that is combined with buffer prior to use In another embodiment, the formulations disclosed herein can be delivered by the use of liposomes which fuse with the cellular membrane or are endocytosed, i.e., by employing ligands attached to the liposome, or attached directly to the oligonucleotide, that bind to surface membrane protein receptors of the cell resulting in endocytosis. By using liposomes, particularly where the liposome surface carries ligands specific for target cells, or are otherwise preferentially directed to a specific organ, one can focus the delivery of the GR modulator into the target cells in vivo. (See, e.g., Al-Muhammed, *J. Microencapsul.* 13:293-306, 1996; Chonn, *Curr. Opin. Biotechnol.* 6:698-708, 1995; Ostro, *Am. J. Hosp. Pharm.* 46:1576-1587, 1989).

The pharmaceutical preparation is preferably in unit dosage form. In such form the preparation is subdivided into unit doses containing appropriate quantities of the active component, a nonsteroidal SGRA. The unit dosage form can be a packaged preparation, the package containing discrete quantities of preparation, such as packeted tablets, capsules, and powders in vials or ampoules. Also, the unit dosage form can be a capsule, tablet, cachet, or lozenge itself, or it can be the appropriate number of any of these in packaged form.

The quantity of active component in a unit dose preparation may be varied or adjusted from 0.1 mg to 10000 mg, more typically 1.0 mg to 6000 mg, most typically 50 mg to 500 mg. Suitable dosages also include about 1 mg, 5, 10, 20, 30, 40, 50, 60, 70, 80, 90, 100, 200, 300, 400, 500, 600, 700, 800, 900, 1000, 1100, 1200, 1300, 1400, 1500, 1600, 1700, 1800, 1900, or 2000 mg, according to the particular application and the potency of the active component. The composition can, if desired, also contain other compatible therapeutic agents.

The pharmaceutical preparation is preferably in unit dosage form. In such form the preparation is subdivided into unit doses containing appropriate quantities of the compounds and compositions of the present invention. The unit dosage form can be a packaged preparation, the package containing discrete quantities of preparation, such as packeted tablets, capsules, and powders in vials or ampoules. Also, the unit dosage form can be a capsule, tablet, cachet, or lozenge itself, or it can be the appropriate number of any of these in packaged form.

Nonsteroidal SGRAs can be administered orally. For example, the nonsteroidal SGRA can be administered as a pill, a capsule, or liquid formulation as described herein. Alternatively, nonsteroidal SGRAs can be provided via parenteral administration. For example, the nonsteroidal SGRA can be administered intravenously (e.g., by injection or infusion). Additional methods of administration of the compounds described herein, and pharmaceutical compositions or formulations thereof, are described herein.

In some embodiments, the nonsteroidal SGRA is administered in one dose. In other embodiments, the nonsteroidal SGRA is administered in more than one dose, e.g., 2 doses, 3 doses, 4 doses, 5 doses, 6 doses, 7 doses, or more. In some cases, the doses are of an equivalent amount. In other cases, the doses are of different amounts. The doses can increase or taper over the duration of administration. The amount will vary according to, for example, the nonsteroidal SGRA properties and patient characteristics.

Any suitable nonsteroidal SGRA dose may be used in the methods disclosed herein. The dose of nonsteroidal SGRA that is administered can be at least about 300 milligrams (mg) per day, or about 600 mg/day, e.g., about 600 mg/day, about 700 mg/day, about 800 mg/day, about 900 mg/day, about 1000 mg/day, about 1100 mg/day, about 1200 mg/day, or more. For example, where the nonsteroidal SGRA is relacorilant, the nonsteroidal SGRA dose may be, e.g., 50 mg/day, or 75 mg/day, or 100 mg/day, or 125 mg/day, or 150 mg/day, or 175 mg/day, or 200 mg/day, or 225 mg/day, or 250 mg/day, or 300 mg/day, or 350 mg/day, or 400 mg/day, or other amount of relacorilant. In embodiments, the nonsteroidal SGRA is administered orally. In some embodiments, the nonsteroidal SGRA is administered in at least one dose. In other words, the nonsteroidal SGRA can be administered in 1, 2, 3, 4, 5, 6, 7, 8, 9, 10 or more doses per day. In embodiments, the nonsteroidal SGRA is administered orally in 1, 2, 3, 4, 5, 6, 7, 8, 9, 10 or more doses per day.

The subject may be administered at least one dose of nonsteroidal SGRA in one or more doses over, for example, a 2-48 hour period. In some embodiments, the nonsteroidal SGRA is administered as a single dose. In other embodiments, the nonsteroidal SGRA is administered in more than one dose, e.g. 2 doses, 3 doses, 4 doses, 5 doses, or more doses over a 2-48 hour period, e.g., a 2 hour period, a 3 hour period, a 4 hour period, a 5 hour period, a 6 hour period, a 7 hour period, a 8 hour period, a 9 hour period, a 10 hour period, a 11 hour period, a 12 hour period, a 14 hour period, a 16 hour period, a 18 hour period, a 20 hour period, a 22 hour period, a 24 hour period, a 26 hour period, a 28 hour period, a 30 hour period, a 32 hour period, a 34 hour period, a 36 hour period, a 38 hour period, a 40 hour period, a 42 hour period, a 44 hour period, a 46 hour period or a 48 hour period. In some embodiments, the nonsteroidal SGRA is administered over 2-48 hours, 2-36 hours, 2-24 hours, 2-12 hours, 2-8 hours, 8-12 hours, 8-24 hours, 8-36 hours, 8-48 hours, 9-36 hours, 9-24 hours, 9-20 hours, 9-12 hours, 12-48 hours, 12-36 hours, 12-24 hours, 18-48 hours, 18-36 hours, 18-24 hours, 24-36 hours, 24-48 hours, 36-48 hours, or 42-48 hours.

Single or multiple administrations of formulations can be administered depending on the dosage and frequency as required and tolerated by the patient. The formulations should provide a sufficient quantity of active agent to effectively treat the disease state. Thus, in one embodiment, the pharmaceutical formulation for oral administration of a nonsteroidal SGRA is in a daily amount of between about 0.01 to about 150 mg per kilogram of body weight per day (mg/kg/day). In some embodiments, the daily amount is from about 1.0 to 100 mg/kg/day, 5 to 50 mg/kg/day, 10 to 30 mg/kg/day, and 10 to 20 mg/kg/day. Lower dosages can be used, particularly when the drug is administered to an anatomically secluded site, such as the cerebral spinal fluid (CSF) space, in contrast to administration orally, into the blood stream, into a body cavity or into a lumen of an organ. Substantially higher dosages can be used in topical administration. Actual methods for preparing parenterally administrable formulations will be known or apparent to those skilled in the art and are described in more detail in such publications as Remington's, supra. See also Nieman, In "Receptor Mediated Antisteroid Action," Agarwal, et al., eds., De Gruyter, New York (1987).

The duration of treatment with a nonsteroidal SGRA to reduce the NLR, to treat cancer patient with high NLR, to enhance cancer treatment of the patient, to aid chemotherapy (e.g., taxane-related treatment, for example, to improve the response of a cancer patient with high NLR to nab-paclitaxel treatment) of a cancer patient, or to improve the health of a cancer patient, or to otherwise ameliorate the symptoms of cancer in a cancer patient, can vary according to the severity of the condition in a subject and the subject's response to nonsteroidal SGRAs. In some embodiments, nonsteroidal SGRAs can be administered for a period of about 1 week to 104 weeks (2 years), more typically about 6 weeks to 80 weeks, most typically about 9 to 60 weeks. Suitable periods of administration also include 5 to 9 weeks, 5 to 16 weeks, 9 to 16 weeks, 16 to 24 weeks, 16 to 32 weeks, 24 to 32 weeks, 24 to 48 weeks, 32 to 48 weeks, 32 to 52 weeks, 48 to 52 weeks, 48 to 64 weeks, 52 to 64 weeks, 52 to 72 weeks, 64 to 72 weeks, 64 to 80 weeks, 72 to 80 weeks, 72 to 88 weeks, 80 to 88 weeks, 80 to 96 weeks, 88 to 96 weeks, and 96 to 104 weeks. Suitable periods of administration also include 5, 6, 7, 8, 9, 10, 11, 12, 13, 14, 15, 16, 17, 18, 19, 20, 24, 25, 30, 32, 35, 40, 45, 48 50, 52, 55, 60, 64, 65, 68, 70, 72, 75, 80, 85, 88 90, 95, 96, 100, and 104 weeks. Generally administration of a nonsteroidal SGRA should be continued until clinically significant reduction or amelioration is observed. Treatment with the nonsteroidal SGRA in accordance with the invention may last for as long as two years or even longer.

In some embodiments, administration of a nonsteroidal SGRA is not continuous and can be stopped for one or more periods of time, followed by one or more periods of time where administration resumes. Suitable periods where administration stops include 5 to 9 weeks, 5 to 16 weeks, 9 to 16 weeks, 16 to 24 weeks, 16 to 32 weeks, 24 to 32 weeks, 24 to 48 weeks, 32 to 48 weeks, 32 to 52 weeks, 48 to 52 weeks, 48 to 64 weeks, 52 to 64 weeks, 52 to 72 weeks, 64 to 72 weeks, 64 to 80 weeks, 72 to 80 weeks, 72 to 88 weeks, 80 to 88 weeks, 80 to 96 weeks, 88 to 96 weeks, and 96 to 100 weeks. Suitable periods where administration stops also include 5, 6, 7, 8, 9, 10, 11, 12, 13, 14, 15, 16, 17, 18, 19, 20, 24, 25, 30, 32, 35, 40, 45, 48 50, 52, 55, 60, 64, 65, 68, 70, 72, 75, 80, 85, 88 90, 95, 96, and 100 weeks.

The dosage regimen also takes into consideration pharmacokinetics parameters well known in the art, i.e., the rate of absorption, bioavailability, metabolism, clearance, and the like (see, e.g., Hidalgo-Aragones (1996) *J. Steroid Biochem. Mol. Biol.* 58:611-617; Groning (1996) *Pharmazie* 51:337-341; Fotherby (1996) *Contraception* 54:59-69; Johnson (1995) *J. Pharm. Sci.* 84:1144-1146; Rohatagi (1995) *Pharmazie* 50:610-613; Brophy (1983) *Eur. J. Clin. Pharmacol.* 24:103-108; the latest Remington's, supra). The state of the art allows the clinician to determine the dosage regimen for each individual patient, GR modulator and disease or condition treated.

Nonsteroidal SGRAs can be used in combination with other active agents known to be useful in modulating a glucocorticoid receptor, or with adjunctive agents that may not be effective alone, but may contribute to the efficacy of the active agent.

In some embodiments, co-administration includes administering one active agent, a nonsteroidal SGRA, within 0.5, 1, 2, 4, 6, 8, 10, 12, 16, 20, or 24 hours of a second active agent. Co-administration includes administering two active agents simultaneously, approximately simultaneously (e.g., within about 1, 5, 10, 15, 20, or 30 minutes of each other), or sequentially in any order. In some embodiments, co-administration can be accomplished by co-formulation, i.e., preparing a single pharmaceutical composition including both active agents. In other embodiments, the active agents can be formulated separately. In another embodiment, the active and/or adjunctive agents may be linked or conjugated to one another.

After a pharmaceutical composition including a nonsteroidal SGRA has been formulated in an acceptable carrier, it can be placed in an appropriate container and labeled for treatment of an indicated condition. For administration of a nonsteroidal SGRA, such labeling would include, e.g., instructions concerning the amount, frequency and method of administration.

The pharmaceutical compositions of the present invention can be provided as a salt and can be formed with many acids, including but not limited to hydrochloric, sulfuric, acetic, lactic, tartaric, malic, succinic, etc. Salts tend to be more soluble in aqueous or other protonic solvents that are the corresponding free base forms. In other cases, the preparation may be a lyophilized powder in 1 mM-50 mM histidine, 0.1%-2% sucrose, 2%-7% mannitol at a pH range of 4.5 to 5.5, that is combined with buffer prior to use.

In another embodiment, the compositions of the present invention are useful for parenteral administration, such as intravenous (IV) administration or administration into a body cavity or lumen of an organ. The formulations for administration will commonly comprise a solution of the compositions of the present invention dissolved in a pharmaceutically acceptable carrier. Among the acceptable vehicles and solvents that can be employed are water and Ringer's solution, an isotonic sodium chloride. In addition, sterile fixed oils can conventionally be employed as a solvent or suspending medium. For this purpose any bland fixed oil can be employed including synthetic mono- or diglycerides. In addition, fatty acids such as oleic acid can likewise be used in the preparation of injectables. These solutions are sterile and generally free of undesirable matter. These formulations may be sterilized by conventional, well known sterilization techniques. The formulations may contain pharmaceutically acceptable auxiliary substances as required to approximate physiological conditions such as pH adjusting and buffering agents, toxicity adjusting agents, e.g., sodium acetate, sodium chloride, potassium chloride, calcium chloride, sodium lactate and the like. The concentration of the compositions of the present invention in these formulations can vary widely, and will be selected primarily based on fluid volumes, viscosities, body weight, and the like, in accordance with the particular mode of administration selected and the patient's needs. For IV administration, the formulation can be a sterile injectable preparation, such as a sterile injectable aqueous or oleaginous suspension. This suspension can be formulated according to the known art using those suitable dispersing or wetting agents and suspending agents. The sterile injectable preparation can also be a sterile injectable solution or suspension in a nontoxic parenterally-acceptable diluent or solvent, such as a solution of 1,3-butanediol.

E. Cancer Treatments

Cancer Chemotherapeutic Agents

In embodiments, the cancer treatment administered to the patient with high NLR may include administration of a chemotherapeutic agent. Chemotherapeutic agents suitable for use in combination with the nonsteroidal SGRA to normalize (reduce) NLR in cancer patients with high NLR and receiving cancer treatments include agents that have the property of killing cancer cells or inhibiting cancer cell growth, include, but are not limited to antimicrotubule agents (e.g., taxanes, vinca alkaloids, and plinabulin), topoisomerase inhibitors and antimetabolites (e.g., nucleoside analogs acting as such, for example, Gemcitabine), mitotic inhibitors, alkylating agents, antimetabolites, anti-tumor antibiotics, mitotic inhibitors, anthracyclines, intercalating agents, agents capable of interfering with a signal transduction pathway, agents that promote apoptosis, proteosome inhibitors, and the like. Additional anti-cancer agents, such as those disclosed in US Pat. Pub. No. 20150218274, and also at, e.g., the website "chemocare.com" at page chemotherapy/what-is-chemotherapy/types-of-chemotherapy.aspx may also be used in the practice of the methods disclosed herein.

Antimicrotubule agents include taxanes, vinca alkaloids, and plinabulin. Exemplary taxanes that can be used in combination with the nonsteroidal SGRA to treat the cancer patient include, but are not limited to paclitaxel and docetaxel. Non-limiting examples of paclitaxel agents include nanoparticle albumin-bound paclitaxel (ABRAXANE, marketed by Abraxis Bioscience), docosahexaenoic acid bound-paclitaxel (DHA-paclitaxel, Taxoprexin, marketed by Protarga), polyglutamate bound-paclitaxel (PG-paclitaxel, paclitaxel poliglumex, CT-2103, XYOTAX, marketed by Cell Therapeutic), the tumor-activated prodrug (TAP), ANG105 (Angiopep-2 bound to three molecules of paclitaxel, marketed by ImmunoGen), paclitaxel-EC-1 (paclitaxel bound to the erbB2-recognizing peptide EC-1; see Li et al., Biopolymers (2007) 87:225-230), and glucose-conjugated paclitaxel (e.g., 2'-paclitaxel methyl 2-glucopyranosyl succinate, see Liu et al., Bioorganic & Medicinal Chemistry Letters (2007) 17:617-620). Exemplary vinca alkaloids that can be used in combination with the nonsteroidal SGRA to treat the cancer patient include, but are not limited to, vinorelbine tartrate (Navelbine®), Vincristine (Oncovin®), and Vindesine (Eldisine®)); vinblastine (also known as vinblastine sulfate, vincaleukoblastine and VLB, Alkaban-AQ® and Velban®); and vinorelbine (Navelbine®). Plinabulin is a small molecule that blocks microtubule assembly (e.g., polymerization), has antiangiogenic activity (e.g., reduces tumor vascularization), and can induce apoptosis and mitotic growth arrest.

Alkylating agents are most active in the resting phase of the cell. These types of drugs are cell-cycle non-specific. Exemplary alkylating agents that can be used in combination with the nonsteroidal SGRA to treat the cancer patient include, without limitation, nitrogen mustards, ethylenimine derivatives, alkyl sulfonates, nitrosoureas and triazenes): uracil mustard (Aminouracil Mustard®, Chlorethaminacil®, Demethyldopan®, Desmethyldopan®, Haemanthamine®, Nordopan®, Uracil nitrogen Mustard®, Uracillost®, Uracilmostaza®, Uramustin®, Uramustine®), chlormethine (Mustargen®), cyclophosphamide (Cytoxan®, Neosar®, Clafen®, Endoxan®, Procytox®, Revimmune™) ifosfamide (Mitoxana®), melphalan (Alkeran®), Chlorambucil (Leukeran®), pipobroman (Amedel®, Vercyte®), triethylenemelamine (Hemel®, Hexalen®, Hexastat®), triethylenethiophosphoramine, thiotepa (Thioplex®), busulfan (Busilvex®, Myleran®), carmustine (BiCNU®), lomustine (CeeNU®), streptozocin (Zanosar®), and Dacarbazine (DTIC-Dome®). Additional exemplary alkylating agents include, without limitation, Oxaliplatin (Eloxatin®); Temozolomide (Temodar® and Temodal®); Dactinomycin (also known as actinomycin-D, Cosmegen®); Melphalan (also known as L-PAM, L-sarcolysin, and phenylalanine mustard, Alkeran®); Altretamine (also known as hexamethylmelamine (HMM), Hexalen®); Carmustine (BiCNU®); Bendamustine (Treanda®); Busulfan (Busulfex® and Myleran®); Carboplatin (Paraplatin®); Lomustine (also known as CCNU, CeeNU®); Cisplatin (also known as CDDP, Platinol® and Platinol®-AQ); Chlorambucil (Leukeran®); Cyclophosphamide (Cytoxan® and Neosar®); Dacarbazine (also known as DTIC, DIC and imidazole carboxamide, DTIC-Dome®); Altretamine (also known as hexamethylmelamine (HMM), Hexalen®); Ifosfamide (Ifex®); Prednumustine; Procarbazine (Matulane®); Mechlorethamine (also known as nitrogen mustard, mustine and mechloroethamine hydrochloride, Mustargen®); Streptozocin (Zanosar®); Thiotepa (also known as thiophosphoamide, TESPA and TSPA, Thioplex®); Cyclophosphamide (Endoxan®, Cytoxan®, Neosar®, Procytox®, Revimmune®); and Bendamustine HCl (Treanda®).

Antitumor antibiotics are chemo agents obtained from natural products produced by species of the soil fungus *Streptomyces*. These drugs act during multiple phases of the cell cycle and are considered cell-cycle specific. There are several types of antitumor antibiotics, including but are not limited to Anthracyclines (e.g., Doxorubicin, Daunorubicin, Epirubicin, Mitoxantrone, and Idarubicin), Chromomycins (e.g., Dactinomycin and Plicamycin), Mitomycin and Bleomycin.

Antimetabolites are types of chemotherapy treatments that are cell-cycle specific. When the cells incorporate these antimetabolite substances into the cellular metabolism, they are unable to divide. These class of chemotherapy agents include folic acid antagonists such as Methotrexate; pyrimidine antagonists such as 5-Fluorouracil, Foxuridine, Cytarabine, Capecitabine, and Gemcitabine; purine antagonists such as 6-Mercaptopurine and 6-Thioguanine; Adenosine deaminase inhibitors such as Cladribine, Fludarabine, Nelarabine and Pentostatin.

Exemplary anthracyclines that can be used in combination with the nonsteroidal SGRA in treating the cancer patient include, e.g., doxorubicin (Adriamycin® and Rubex®); Bleomycin (Lenoxane®); Daunorubicin (dauorubicin hydrochloride, daunomycin, and rubidomycin hydrochloride, Cerubidine®); Daunorubicin liposomal (daunorubicin citrate liposome, DaunoXome®); Mitoxantrone (DHAD, Novantrone®); Epirubicin (Ellence); Idarubicin (Idamycin®, Idamycin PFS®); Mitomycin C (Mutamycin®); Geldanamycin; Herbimycin; Ravidomycin; and Desacetylravidomycin.

Exemplary proteosome inhibitors that can be used in combination with the nonsteroidal SGRA in treating the cancer patient, include, but are not limited to, Bortezomib (Velcade.RTM.); Carfilzomib (PX-171-007, (S)-4-Methyl-N-((S)-1-(((S)-4-methyl-1-((R)-2-methyloxiran-2-yl)-1-oxope- ntan-2-yl)amino)-1-oxo-3-phenylpropan-2-yl)-2-((S)-2-(2-morpholinoacetamid-o)-4-phenylbutanamido)-pentanamide); marizomib (NPI-0052); ixazomib citrate (MLN-9708); delanzomib (CEP-18770); and O-Methyl-N-[(2-methyl-5-thiazolyl)carbonyl]-L-seryl-O-methyl-N-[(1S)-2-[(-2R)-2-methyl-2-oxiranyl]-2-oxo-1-(phenylmethyl)ethyl]-L-serinamide (ONX-0912).

In some embodiments, the chemotherapeutic agent is selected from the group consisting of chlorambucil, cyclophosphamide, ifosfamide, melphalan, streptozocin, carmustine, lomustine, bendamustine, uramustine, estramustine, carmustine, nimustine, ranimustine, mannosulfan busulfan, dacarbazine, temozolomide, thiotepa, altretamine, 5-fluorouracil (5-FU), 6-mercaptopurine (6-MP), capecitabine, cytarabine, floxuridine, fludarabine, gemcitabine, hydroxyurea, methotrexate, pemetrexed, daunorubicin, doxorubicin, epirubicin, idarubicin, SN-38, ARC, NPC, campothecin, topotecan, 9-nitrocamptothecin, 9-aminocamptothecin, rubifen, gimatecan, diflomotecan, BN80927, DX-895 If, MAG-CPT, amsacrine, etoposide, etoposide phosphate, teniposide, doxorubicin, paclitaxel, docetaxel, accatin III, 10-deacetyltaxol, 7-xylosyl-10-deacetyltaxol, cephalomannine, 10-deacetyl-7-epitaxol, 7-epitaxol, 10-deacetylbaccatin III, 10-deacetyl cephalomannine, Irinotecan, albumin-bound paclitaxel, Oxaliplatin, Capecitabine, Cisplatin, docetaxel, irinotecan liposome, and etoposide, and combinations thereof.

In certain embodiments, the chemotherapeutic agent is administered at a dose and a schedule that may be guided by doses and schedules approved by the U.S. Food and Drug Administration (FDA) or other regulatory body, subject to empirical optimization. In some cases, the chemotherapeutic agent is administered at a dose of about 100 to 1000 mg, e.g., about 200 mg to 800 mg, about 300 mg to 700 mg, or about 400 mg to 600 mg, e.g., about 200 mg, 300 mg, 400 mg, 500 mg, 600 mg, or 700 mg. The dosing schedule can vary from, e.g. every week, every five days, every four days, every other day to daily, twice, or three times a day. In one embodiment, the chemotherapeutic agent is administered at an oral dose or an intravenous dose from about 100 mg to 600 mg daily, e.g., about 100 mg, 200 mg, 260 mg, 300 mg, 400 mg, or 600 mg daily, every other day or every four days for the whole or a portion of the treatment period. In some embodiments, the chemotherapeutic agent is a taxane and can be used at any standard dose, for example those taxane doses approved by the FDA, in accordance with the methods disclosed herein. In various embodiments, the taxane is nab-paclitaxel, which is administered at a dose ranging from 80 mg to 125 mg per square meter of body-surface area as an intravenous infusion over 30 minutes on days 1, 8, and 15 of every 28-day cycle.

In still further embodiments, more than one chemotherapeutic agent may be administered simultaneously, or sequentially in any order during the entire or portions of the treatment period. The two agents may be administered following the same or different dosing regimens.

Immunotherapeutic Agents

In embodiments, the cancer treatment administered to the patient with high NLR may include administration an immunotherapeutic agent. Immunotherapeutic agents suitable for use in combination with the nonsteroidal SGRA to normalize (reduce) NLR in cancer patients with high NLR and receiving cancer treatments include antibodies against checkpoint proteins, and include small molecule inhibitors of checkpoint activity. A number of such antibodies have already been shown to be effective in treating cancers, e.g., antibodies against PD-1, CTLA4, and PD-L1. In embodiments, the cancer treatment administered with a nonsteroidal SGRA may include administration of a checkpoint inhibitor, and the checkpoint inhibitor may be a checkpoint inhibitor antibody (CIA).

Anti-PD-1 antibodies have been used for the treatment of melanoma, non-small-cell lung cancer, bladder cancer, prostate cancer, colorectal cancer, head and neck cancer, triple-negative breast cancer, leukemia, lymphoma and renal cell cancer. Exemplary anti-PD-1 antibodies include pembrolizumab (Keytruda®, also known as lambrolizumab and as MK-3475, Merck), nivolumab (Opdivo®, also known as BMS-936558, Bristol Myers Squibb), cemiplimab (Libtayo®, Sanofi), spartalizumab (PDR001, Novartis), AMP-224 (AstraZeneca), AMP-514 (MEDI0680, AstraZeneca), REGN2810 (Regeneron), Tislelizumab (BGB-A317, BeiGene), BGB-A317 (BeiGene), pidilizumab (CT-011, Curetech LTD), JTX-4014 (Jounce Therapeutics), Camrelizumab (SHR1210, Jiangsu HengRui Medicine Co., Ltd.), Sintilimab (IBI308, Eli Lilly), Toripalimab (JS001, Shanghai Junshi Biosciences), Dostarlimab (TSR-042, WBP-285, GlaxoSmithKline), and INCMGA00012 (MGA012, Incyte and Macrogenics).

Anti-PD-L1 antibodies have been used for treatment of non-small cell lung cancer, melanoma, colorectal cancer, renal-cell cancer, pancreatic cancer, gastric cancer, ovarian cancer, breast cancer, and hematologic malignancies. Exemplary anti-PD-L1 antibodies include atezolizumab (Tecentriq®, Roche), avelumab (Bavencio®, MSB0010718C, MerckKGaA and Pfizer), durvalumab (Imfinzi®, AstraZeneca), MDX-1105 (Bristol Myers Squibb), MEDI4736 (Medimmune), MPDL3280A (Roche), BMS-936559 (Bristol Myers Squibb), Cosibelimab (CK-301 (Checkpoint Therapeutics), and envafolimab (KN035, a "nanobody" (camel antibody), Tracon Therapeutics).

Anti-CTLA4 antibodies have been used in clinical trials for the treatment of melanoma, prostate cancer, small cell lung cancer, non-small cell lung cancer. A significant feature of anti-CTL4A is the kinetics of anti-tumor effect, with a lag period of up to 6 months after initial treatment required for physiologic response. In some cases, tumors may actually increase in size after treatment initiation, before a reduction is seen (Pardoll, 2012, Nature Reviews Cancer 12:252-264). Exemplary anti-CTLA4 CIAs include ipilimumab (Yervoy®, Bristol Myers Squibb), and tremelimumab (formerly ticilimumab, CP-675,206, AstraZeneca).

CIAs against other checkpoint proteins, such as, e.g., varlilumab, ARGX-110, LAG3, LAG525, B7-H3, B7-H4, OX-40, CD137, MEDI6383, MEDI6469, MOXR0916, and TIM3, may also be used in combination with the nonsteroidal SGRAs disclosed herein to treat cancers.

The CIAs used in this disclosure can be a combination of different CIAs, especially if the target checkpoint proteins, e.g., PD-1 and CTLA4, suppress immune response via different signaling pathways. Thus a combination of CIAs against either of the checkpoint proteins or a single CIA that is against both checkpoint proteins may provide an enhanced immune response.

Generating CIAs

CIAs can be developed using methods well known in the art. See, for example, Kohler and Milstein, Nature 256: 495 (1975), and Coligan et al. (eds.), *Current Protocols in Immunology*, VOL. 1, pages 2.5.1-2.6.7 (John Wiley & Sons 1991). Monoclonal antibodies can be obtained by injecting mice with a composition comprising an antigen, e.g. a checkpoint protein or an epitope of thereof, removing the spleen to obtain B-lymphocytes, fusing the B-lymphocytes with myeloma cells to produce hybridomas, cloning the hybridomas, selecting positive clones which produce antibodies to the antigen, culturing the clones that produce antibodies to the antigen, and isolating the antibodies from the hybridoma cultures.

Monoclonal antibodies produced can be isolated and purified from hybridoma cultures by a variety of well-established techniques. Such isolation techniques include affinity chromatography with Protein-A Sepharose, size-exclusion chromatography, and ion-exchange chromatography. See, for example, Coligan at pages 2.7.1-2.7.12 and pages 2.9.1-2.9.3. Also, see Baines et al., "Purification of Immunoglobulin G (IgG)," in *Methods in Molecular Biology*, VOL. 10, pages 79-104 (The Humana Press, Inc. 1992). After the initial raising of antibodies to a checkpoint protein, the antibodies can be sequenced and subsequently prepared by recombinant techniques. Humanization and chimerization of murine antibodies and antibody fragments are well known to those skilled in the art. See, for example, Leung et al. Hybridoma 13:469 (1994); US20140099254 A1.

Human antibodies can be produced using transgenic mice that have been genetically engineered to produce specific human antibodies in response to antigenic challenge using a checkpoint protein. See Green et al., *Nature Genet*. 7: 13 (1994), Lonberg et al., *Nature* 368:856 (1994). Human antibodies against a checkpoint protein also can be constructed by genetic or chromosomal trandfection methods, phage display technology, or by in vitro activated B cells. See e.g., McCafferty et al., 1990, Nature 348: 552-553; U.S Pat. Nos. 5,567,610 and 5,229,275.

Modifying CIAs

CIAs may also be produced by introducing conservative modifications relative to the existing CIAs. For example, a modifed CIA may comprise heavy and light chain variable regions, and/or a Fc region that are homologous to the counterparts of an antibody produced above. The modified CIA that can be used for the method disclosed herein must retain the desired functional properties of being able to block the checkpoint signaling pathway.

CIAs may also be produced by altering protein modification sites. For example, sites of glycosylation of the antibody can be altered to produce an antibody lacking glycosylation and the so modified CIAs typically have increased affinity of the antibody for antigen. Antibodies can also be pegylated by reacting with polyethylene glycol (PEG) under conditions in which one or more PEG groups become attached to the antibody. Pegylation can increase the biological half-life of the antibody. Antibodies having such modifications can also be used in combination with the selective GR modulator disclosed herein so long as it retains the desired functional properties of blocking the checkpoint pathways.

ii. Small Molecule, Non-Protein Checkpoint Inhibitor Compounds ("CICs")

In another embodiment, the cancer treatment administered with a nonsteroidal SGRA may include administration of a checkpoint inhibitor, and the checkpoint inhibitor may be a CIC. A CIC is a small molecule, non-protein compound that antagonizes a checkpoint protein's immune suppression function. Many CICs are known in the art, for example, the small molecule checkpoint inhibitor CA-170 (Aurigene), the peptide checkpoint inhibitors AUNP12 (Aurigene and Laboratoire Pierre-Fabre) and BMS-986189 (Bristol Myers Squibb), and those disclosed in U.S. Pat. Nos. 9,872,852; 9,422,339; and in US Patent Publication 2013-0022629 A1.

CICs can also be identified using any of the numerous approaches in combinatorial library methods known in the art and disclosed in, e.g., European patent application EP2360254. The cominatorial libraries include: biological libraries; spatially addressable parallel solid phase or solution phase libraries; synthetic library methods requiring deconvolution; the 'one-bead one-compound' library method; and synthetic library methods using affinity chromatography selection. The biological library approach is limited to peptide libraries, while the other four approaches are applicable to peptide, non-peptide oligomer or small molecule libraries of compounds (Lam, K. S. (1997) *Anticancer Drug Des.* 12:145).

Radiation Cancer Treatments

Radiation may be used to treat cancer. In embodiments, the cancer treatment administered to the patient with high NLR may include administration of radiotherapy (e.g., direction of ionizing radiation to a tumor, infusion of a radioactive pharmaceutical composition, implantation of a radiation source, or other radiotherapy). Radiation treatments suitable for use in combination with the nonsteroidal SGRA to normalize NLR in cancer patients having NLR and receiving cancer treatment include directing radiation at a tumor or cancerous region (which may be termed "external beam radiation therapy", or "teletherapy"); implanting radiation-emitting material in or near a tumor or cancerous region (which may be termed "brachytherapy"); administering a radiolabeled pharmaceutical composition effective to direct radiation to a cancerous tumor or cancerous region (e.g., a radiolabeled ligand that targets a receptor expressed, and preferably over-expressed, on cancer cells).

Anti-Angiogenic Cancer Treatments

Anti-angiogenic agents reduce or block formation of new blood vessels, and may be used to treat cancer; it is thought that anti-angiogenic agents slow, block, or even reverse tumor growth by limiting blood supply to the tumor. In embodiments, the cancer treatment administered to the patient with high NLR may include administration of anti-angiogenic therapy, e.g., including administration of an anti-angiogenic agent. Anti-angiogenic agents include antibodies that block the action of vascular epithelial growth factor (VEGF), such as, e.g., bevacizumab (Avastin®); carboxyamidotriazole, itraconazole; angiopoeitin2; soluble VEGF receptor and other "decoy" molecules to which VEGF may bind and so reduce its binding to, and activation of, endogenous VEGF receptors which would otherwise spur angiogenesis; angiostatin; endostatin; interferin-α, interferin-β, and interferin-γ; platelet factor-4; vasostatin; calreticulin; prolactin; osteopontin; secreted protein and rich in cysteine (SPARC), also known as osteonectin, and as BM-40; and other angiogenesis inhibitors may be used to treat cancer, and are suitable cancer treatments for use in the methods disclosed herein for normalizing (reducing) NLR in cancer patients having high NLR and receiving cancer treatment.

Growth Factor Inhibition Treatments

In embodiments, the cancer treatment administered to the patient with high NLR may include administration of a growth factor inhibitor. Administration of growth factor inhibitors, including, e.g., inhibitors of epidermal growth factor (EGF), fibroblast growth factor (FGF) and others may comprise a cancer treatment administered to a cancer patient having high NLR, and administration of a nonsteroidal SGRA and a growth factor inhibitor may be effective to normalize (reduce) NLR in the cancer patient, to enhance the growth factor treatment, to reduce tumor load or promote elimination of the tumor(s), and otherwise provide clinical benefit to the cancer patient. Growth factor inhibitors include, for example, tyrosine kinase inhibitors (such as, e.g., axitinib (Inlyta®), dasatinib (Sprycel®), erlotinib (Tarceva®), imatinib (Glivec®), (Tasigna®), pazopanib (Votrient®), and sunitinib (Sutent®)); proteasome inhibitors (such as, e.g. Bortezomib (Velcade®); histone deacetylase inhibitors (such as, e.g., vorinostat (Zolinza®) and Panobinostat (Farydak®)); hedgehog pathway inhibitors (such as, e.g., Vismodegib (Erivedge®); phosphotidyl inosotide 3 kinase (PIP3) inhibitors (such as idelalisib (Zydelig®); mammaian (or mechinistic) target of rapamycin (mTOR) inhibitors (such as, e.g., temsirolimus (Torisel®) and everolimus (Afinitor®)), and others.

Surgical Cancer Treatments

In embodiments, the cancer treatment administered to the patient with high NLR may include surgical treatment for the cancer. Surgery may be used to treat cancer, by removing a tumor, or removing part of a tumor, in order to reduce the tumor load of a patient having a tumor. Administration of a nonsteroidal SGRA to normalize NLR in cancer patients having high NLR may be performed prior to, during, or after, surgery, and may aid in normalizing the NLR of the patient, and may enhance the treatment and health of the cancer patient.

F. Combination Therapies

Various combinations with a nonsteroidal SGRA and one or more cancer treatment(s) may be employed to treat cancer patients, e.g., to reduce NLR in a cancer patient with high NLR. By "combination therapy" or "in combination with", it is not intended to imply that the therapeutic agents must be administered at the same time and/or formulated for delivery together, although these methods of delivery are within the scope described herein. The nonsteroidal SGRA and the chemotherapeutic agent can be administered following the same or different dosing regimen. In some embodiments, the nonsteroidal SGRA and the chemotherapeutic agent is administered sequentially in any order during the entire or portions of the treatment period. In some embodiments, the nonsteroidal SGRA and the anticancer agent is administered simultaneously or approximately simultaneously (e.g., within about 1, 5, 10, 15, 20, or 30 minutes of each other). Non-limiting examples of combination therapies are as follows, with administration of the nonsteroidal SGRA and the chemotherapeutic agent for example, nonsteroidal SGRA is "A" and the anticancer agent or compound, given as part of an chemo therapy regime, is "B":

| A/B/AB/A/BB/B/AA/A/BA/B/BB/A/AA/B/B/B B/A/B/B |
| B/B/B/A B/B/A/B A/A/B/B A/B/A/B A/B/B/A B/B/A/A |
| B/A/B/A B/A/A/B A/A/A/B B/A/A/A A/B/A/A A/A/B/A |

Administration of the therapeutic compounds or agents to a patient will follow general protocols for the administration of such compounds, taking into account the toxicity, if any, of the therapy. Surgical intervention may also be applied in combination with the described therapy.

The present methods can be combined with other means of cancer treatment such as surgery, radiation, immunotherapy, use of growth factor inhibitors, anti-angiogenesis factors and other treatments, and combinations thereof.

G. Evaluate Improvements in Reducing NLR

The nonsteroidal SGRA therapy disclosed herein can reduce the NLR in a cancer patient with high NLR (e.g., an NLR of 3 or greater) and can confer beneficial clinical outcome to such cancer patients. Methods for measuring responses to cancer treatments are well-known to skilled artisans in the field of cancer treatment, e.g., as described in the Response Evaluation Criteria in Solid Tumors ("RECIST") guideline (Eisenhauer et al., "New Response Evaluation Criteria in Solid Tumours: Revised RECIST Guidelines (version 1.1) Eur. J. Cancer 45:228-247 (2009)).

In one approach, the NLR is measured by determining the number of neutrophils and the number of lymphocytes in a blood sample obtained from the cancer patient. A decline in NLR levels after treatment with a nonsteroidal SGRA, e.g., relacorilant, may suggest beneficial treatment of the cancer patient.

A patient receiving the therapy disclosed herein may exhibit varying degrees of NLR reduction. In some cases, a patient can exhibit a reduction of about 10% in the NLR measured prior to treatment; in embodiments, the NLR of a cancer patient with high NLR is reduced by about 15%, or by about 20%, or by about 25%, or by about 30%, or by about 33%, or be about 35%, or by about 40%, or by about 45%, or by about 50%, or more, from the NLR measured prior to treatment. In preferred embodiments, the NLR is reduced to 3 or less; and in most preferred embodiments, the NLR is reduced to less than 3.

Desired beneficial or desired clinical results from the combination therapy may also include e.g., reduction in tumor load; reduced (i.e., slowing to some extent and/or stop) cancer cell infiltration into peripheral organs; inhibited (i.e., slowing to some extent and/or stop) tumor metastasis; increased response rates (RR); increased duration of response; relieved to some extent one or more of the symptoms associated with the cancer; decreased dose of other medications required to treat the disease; delayed progression of the disease; and/or prolonged survival of patients and/or improved quality of life. Methods for evaluating these effects are well known and/or disclosed in, e.g., cancerguide.org/endpoints.html and RECIST guidelines, supra.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

EXAMPLES

The following examples are provided by way of illustration only and not by way of limitation. Those of skill will readily recognize a variety of noncritical parameters which could be changed or modified to yield essentially similar results.

Example 1. HepG2 Tyrosine Aminotransferase (TAT) Assay

The following protocol describes an assay for measuring induction of TAT by dexamethasone in HepG2 cells (a human liver hepatocellular carcinoma cell line; ECACC, UK). HepG2 cells are cultured using MEME media supplemented with 10% (v/v) foetal bovine serum; 2 mM L-glutamine and 1% (v/v) NEAA at 37° C., 5%/95% (v/v) $CO_2$/air. The HepG2 cells are then be counted and adjusted to yield a density of $0.125 \times 10^6$ cells/ml in RPMI 1640 without phenol red, 10% (v/v) charcoal stripped FBS, 2 mM L-glutamine and seeded at 25,000 cells/well in 200 µl into 96 well, sterile, tissue culture micro titre plates, and incubated at 37° C., 5% $CO_2$ for 24 hours.

Growth media are then removed and replaced with assay media {RPMI 1640 without phenol red, 2 mM L-glutamine+10 µM forskolin}. Test compounds are then screened against a challenge of 100 nM dexamethasone. Compounds are then be serially half log diluted in 100% (v/v) dimethylsulfoxide from a 10 mM stock. Then an 8-point half-log dilution curve are generated followed by a 1:100 dilution into assay media to give a 10x final assay of the compound concentration, this results in final assay of the compound concentration that ranged 10 to 0.003 µM in 0.1% (v/v) dimethylsulfoxide.

Test compounds are pre-incubated with cells in microtitre plates for 30 minutes at 37° C., 5/95 (v/v) $CO_2$/air, before the addition of 100 nM dexamethasone and then subsequently for 20 hours to allow optimal TAT induction.

HepG2 cells are then lysed with 30 µl of cell lysis buffer containing a protease inhibitor cocktail for 15 minutes at 4° C. 155 µl of substrate mixture can then be added containing 5.4 mM Tyrosine sodium salt, 10.8 mM alpha ketoglutarate and 0.06 mM pyridoxal 5' phosphate in 0.1M potassium phosphate buffer (pH 7.4). After 2 hours incubation at 37° C. the reaction can be terminated by the addition of 150 µl of 10M aqueous potassium hydroxide solution, and the plates incubated for a further 30 minutes at 37° C. The TAT activity product can be measured by absorbance at $\lambda$ of 340 nm.

$IC_{50}$ values can be calculated by plotting % inhibition (normalised to 100 nM dexamethasone TAT stimulation) v. compound concentration and fitting the data to a 4 parameter logistic equation. $IC_{50}$ values can converted to Ki (equilibrium dissociation constant) using the Cheng and Prusoff equation, assuming the antagonists were competitive inhibitors with respect to dexamethasone.

Example 2. Effect Of Relacorilant on NLR and Cancer Treatment

Figure 7A:
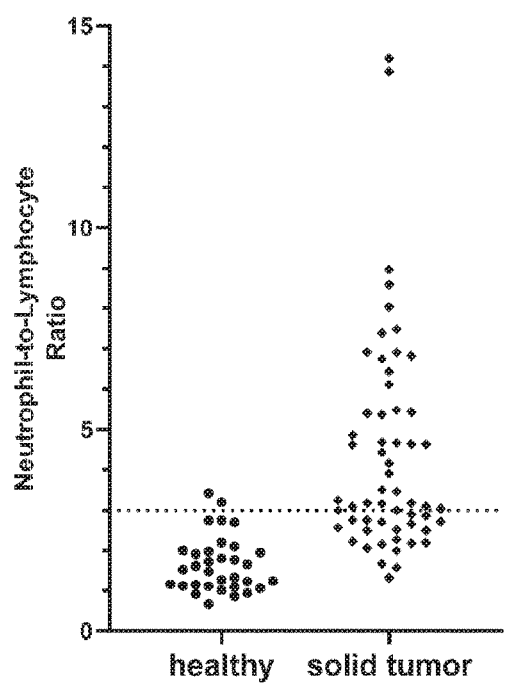
FIG. 7A. NLR is elevated in many cancer patients as compared to NLR in healthy subjects.

The ratio of neutrophils to lymphocytes in the blood (NLR) is typically below 3 in healthy subjects (FIG. 7A). However, this ratio is well above 3 in many cancer patients, as indicated by the NLR values for patients having solid tumors shown in FIG. 7A. In this Example, the effects of relacorilant administration on NLR were determined in healthy subjects and in cancer patients. The results of such relacorilant administration indicate that relacorilant administration reduces NLR, and can normalize NLR, in cancer patients.

Methods:

Healthy Subjects

Healthy subjects were enrolled in the NCT03508635 study of relacorilant. Single and multiple ascending dose cohorts (SAD and MAD) were administered and analyzed as described in FIG. 1, which shows the schedule for dosing and assessment of healthy subjects in this study. Part (A) of FIG. 1 shows the single ascending dose (SAD) prednisone-challenge design of the study. Part (B) of FIG. 1 shows the multiple ascending dose (MAD) prednisone-challenge design of the study. (C) is the Figure legend.

The intensive NLR sampling was conducted at time 0 (morning, pre-dose) and then 2, 4, 8, 12, and 24 hours thereafter. The single NLR samples were collected in the in the morning, pre-dose. The SAD portion of this experiment used a 500 mg dose while the MAD used a once daily 250 mg dose.

Cancer Patients

Cancer Patients were enrolled in study NCT02762981, a phase ½ study of relacorilant in combination with nab-paclitaxel in patients with solid tumors, based on the following criteria:

Key inclusion criteria included
- Consented patients ≥18 years of age with advanced or metastatic solid tumors who have disease progression
- Treated with up to 3 prior lines of therapy in the advanced setting. Previous nab-pac was allowed
- ECOG-PS (Eastern Cooperative Oncology Group Performance Status) 0-1
- Adequate renal, hepatic, and marrow function
- Measurable or evaluable disease For patients enrolled in a specific dose-finding pancreatic cohort, key inclusion criteria included
- Histologically confirmed diagnosis of pancreatic adenocarcinoma. Patients with pancreatic neuroendocrine tumors, lymphoma of the pancreas, or ampullary cancer are not eligible.
- CA19-9 (or CEA, CA-125 in non-CA 19-9 elevated tumors) measured within 14 days prior to first dose of study drug
- Metastatic (non-irradiated) lesion that is measurable by RECIST 1.1

Key exclusion criteria included
- Requirement for treatment with chronic or frequently used oral corticosteroids for medical conditions or illnesses (e.g., rheumatoid arthritis, immunosuppression after organ transplantation).

Assessments

Tumor assessments were performed at screening, end of cycle 2, and every 6-8 weeks thereafter with confirmation of tumor response performed as needed per RECIST (version1.1)

Patients were dosed with relacorilant daily (see FIG. 2) or intermittently (see FIG. 3), and nab-paclitaxel was administered on a 28-day cycle. Abbreviations used in the figures: Nab-Pac, nab-paclitaxel; PK, pharmacokinetic.

The relacorilant lead-in included daily dosing of relacorilant alone (without nab-paclitaxel) for 7 days.

Specimen Collection for Drug Concentration Determination

Drug concentrations were determined in study NCT02762981. Blood was collected at multiple timepoints on day 7 of relacorilant dosing. Upon collection, blood was chelated with EDTA, centrifuged, and plasma was aliquoted. Bioanalytical analyses were conducted by MicroConstants (San Diego, CA, USA). In brief, human plasma samples containing relacorilant and its stable-labeled analog as an internal standard and $K_3$EDTA as the anticoagulant were buffered with an ammonium citrate solution and extracted with 2-butanol:hexane (2.5:97.5, v/v). The samples were vortex mixed, centrifuged and the lower portion was frozen in an ultra-cold freezer. The organic portion was transferred to a clean tube and evaporated under nitrogen. The extracts were dried, reconstituted and analyzed by reversed-phase HPLC using an ACE UltraCore SuperPhenylHexyl column. The mobile phase was nebulized using heated nitrogen in a Z-spray source/interface set to electrospray positive ionization mode. The ionized compounds were detected using MS/MS.

Specimen Collections for CBC

Figure 2:
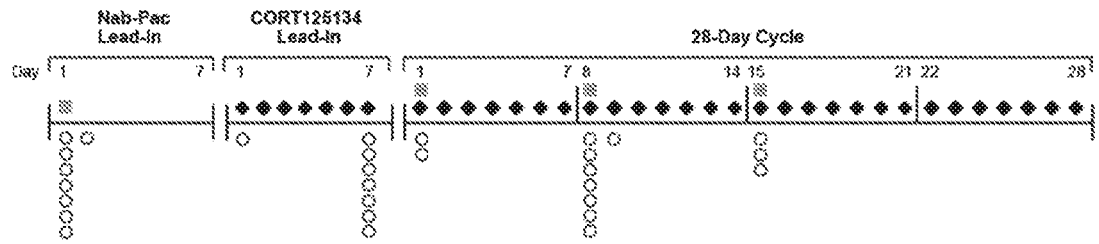
FIG. 2. Patients with Advanced Solid Tumors: Segment I Continuous-Dosing Regimen Part 1: Dose-Finding; Part 2: Dose-Extension. "CORT125134" indicates relacorilant. "PK Draw" indicate blood samples ("draws") taken for pharmacokinetic measurements. "CORT125134" indicates relacorilant.
Figure 2:
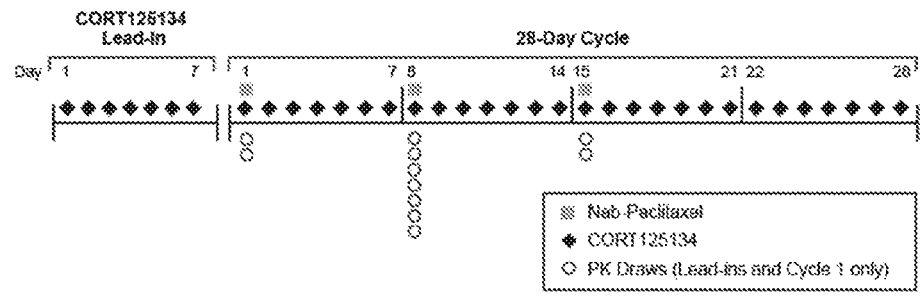
Figure 3:
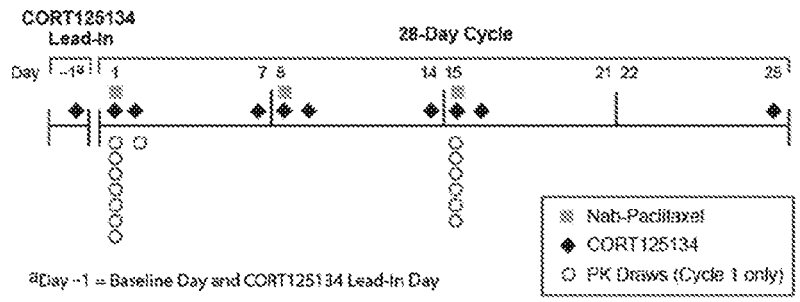
FIG. 3. Patients with Advanced Solid Tumors: Segment II Intermittent-Dosing Regimen: Parts 1 and 2. "PK Draw" indicate blood samples ("draws") taken for pharmacokinetic measurements. "CORT125134" indicates relacorilant.

Blood was collected on the days specified in FIG. 1-3. Blood was also drawn in the morning, pre-dose. Cells from whole blood were incubated with a counterstain to differentiate the cell types. Differential complete blood count (CBC) enumerated neutrophils, lymphocytes, monocytes, eosinophils, and basophils using standard methods.

Data Analysis

The NLR was calculated using the following formula:

NLR=(absolute neutrophil count)/(absolute lymphocyte count)

The NLR is also expressed as a percent change from baseline (CfB) using the formula:

$$NLR\ \%\ CfB = \frac{(NLR\ at\ time_2) - (NLR\ at\ time_1)}{(NLR\ at\ time_1)} \times 100$$

(where "×" indicates multiplcation)

Using this formula, any NLR CfB<0% is a reduction in the NLR. The NLR is also expressed as a fold change from baseline (CfB) using the formula:

NLR fold CfB=(NLR at $time_2$)/(NLR at $time_1$)

Using this formula, any NLR fold CfB less than 1 is a reduction in the NLR.

Standard T-tests were used to assess statistical significance and regenerate the reported p-values. Pharmacokinetic analyses were conducted by Corcept Therapeutics using Phoenix WinNonlin Version 8.1 (Certara, New Jersey, USA). In brief, pharmacokinetic parameters, including $AUC_{0-24}$ and $C_{max}$, for relacorilant were estimated using noncompartmental analysis methods (Model 200) based on intensive PK sampling over 24 hours following the administration of relacorilant on Day 7 of the relacorilant lead-in phase.

Results

Relacorilant Inhibits NLR Increase Due to Prednisone in Healthy Subjects

Figure 4:
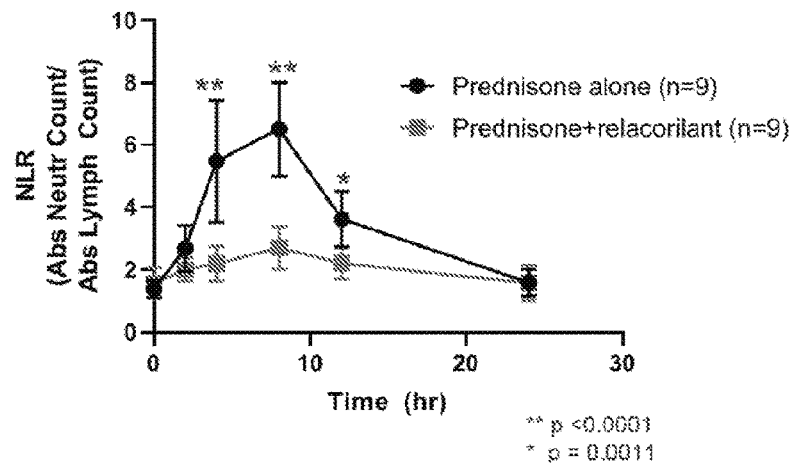
FIG. 4. NLR was measured in 9 healthy subjects administered 25 milligrams (mg) prednisone, in the absence of and in the presence of relacorilant. A single 500 mg dose of relacorilant reversed the effects of 25 mg prednisone on the NLR in healthy subjects.

A single dose of 25 mg prednisone caused an acute increase in the NLR in 9 healthy subjects. The NLR rose from less than 2 at baseline to greater than 6 at 8 hours post prednisone. The NLR returned to baseline after 24 hours. A single dose of 500 mg relacorilant administered with prednisone significantly blunted this NLR effect (FIG. 4). The area under the curve for prednisone alone was 54.6 NLR*hr and was reduced to 12.5 NLR*hr with a single dose or relacorilant.

Figure 5:
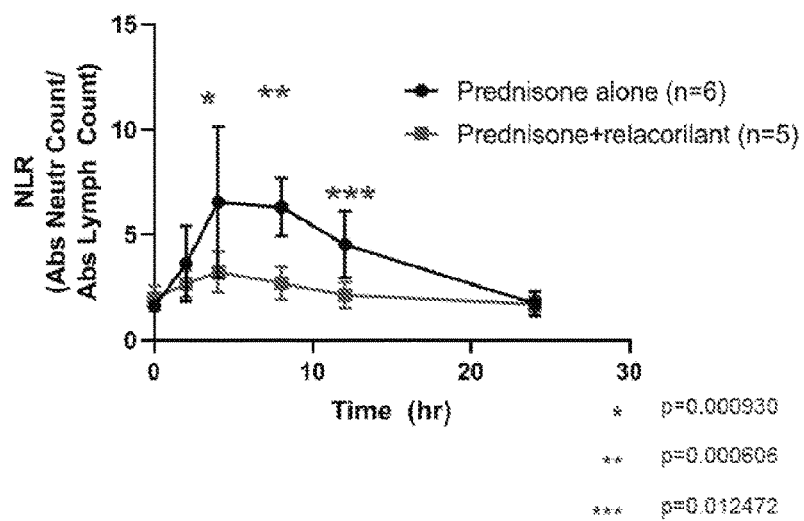
FIG. 5. NLR was measured in healthy subjects administered prednisone in the absence of, and in the presence of, relacorilant. Multiple 250 mg doses (14 consecutive days of 250 mg/day) relacorilant reversed the effects of 25 mg prednisone compared to 25 mg prednisone alone.
Figure 6:
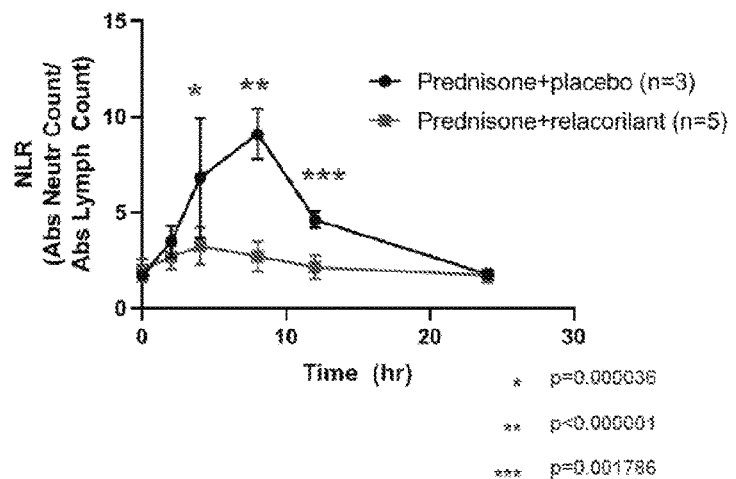
FIG. 6. Multiple 250 mg doses (14 consecutive days of 250 mg/day) of relacorilant reversed the effects of 25 mg prednisone on NLR as compared to NLR measured in healthy subjects administered 14 consecutive days of a placebo control prior to prednisone.

The NLR effect of prednisone after 14 consecutive days of 250 mg per day relacorilant dosing was also assessed. Two controls were included. First, the effect of 25 mg prednisone alone was assessed in the same subjects (on Day −5; FIG. 5). The area under the curve was reduced from 61.7 NLR*hr with prednisone alone to 9.6 NLR*hr after prednisone+relacorilant (25 mg prednisone administered after 14 consecutive days of relacorilant dosing). Second, the effect of 25 mg prednisone after 14 consecutive days of dosing with a placebo (in lieu of relacorilant) was assessed in different subjects (FIG. 6). The area under the curve was reduced from 72 NLR*hr with prednisone+placebo to 9.6 NLR*hr after prednisone+relacorilant (25 mg prednisone administered after 14 consecutive days of 250 mg/day relacorilant dosing). Compared to either control, 14 days of relacorilant dosing significantly blunted the NLR effects of prednisone.

Relacorilant Does Not Affect in the NLR in Healthy Subjects

Figure 7B:
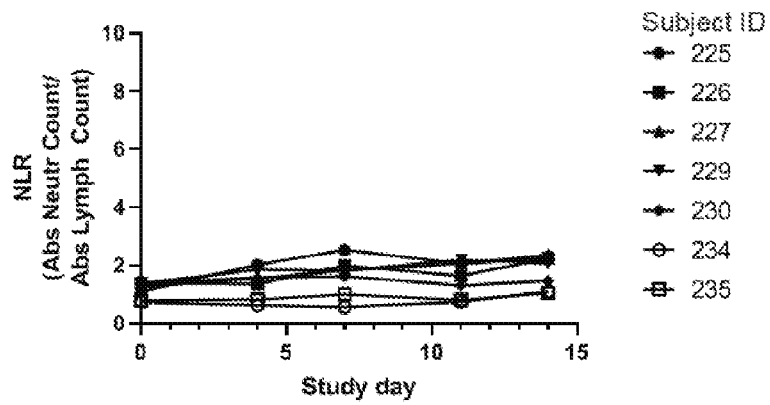
FIG. 7B. 250 mg relacorilant alone does not change the NLR in healthy subjects.

The normalization of the NLR by relacorilant is thought to occur through antagonism of endogenous cortisol. If patients have elevated cortisol activity, relacorilant would be expected to normalize this activity. Alternatively, relacorilant alone could cause neutropenia (reduction in neutrophils) or lymphocytosis (increase in lymphocytes) via antagonism of normal endogenous cortisol. To distinguish these two possibilities, we assessed the effects of relacorilant alone in healthy subject with normal endogenous cortisol. After 14 administering 250 mg of relacorilant for 14 continuous days, no change in the NLR was observed across a cohort of 7 healthy subjects (FIG. 7). None of the healthy subjects had an NLR greater than 3 at baseline.

Figure 8:
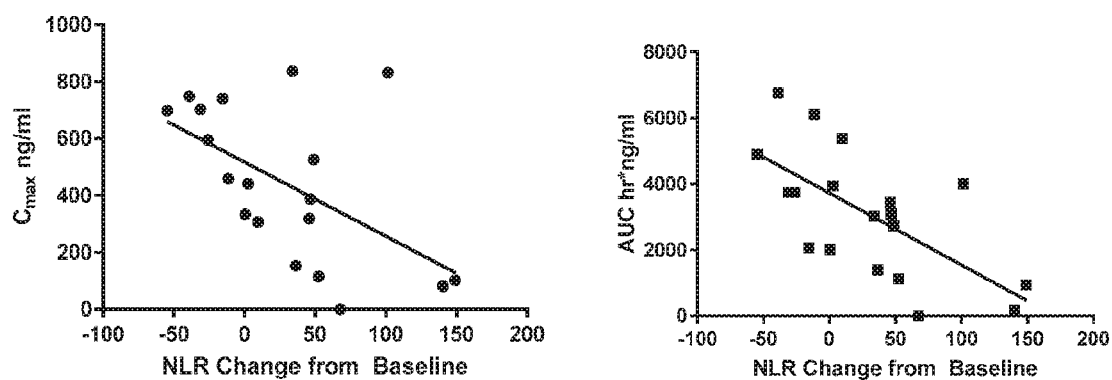
FIG. 8. AUC (right) or $C_{max}$ (left) associated changes in NLR during 7 days of relacorilant alone in patients with advanced solid tumors.

NLR Changes in Patients with Advanced Solid Tumors After Single-Agent Relacorilant The relationship between exposure to relacorilant to the NLR was assessed. The exposure (AUC) and $C_{max}$ on Day 7 were determined and considered to be steady state for the 7-day lead-in period. NLR is expressed as a change from baseline (CfB), where a CfB<0% indicates the NLR decreased during the relacorilant lead-in. In patients with AUC in the range of 0-8000 hr*ng/ml, there is a trend toward decreased NLR at increasing exposures (FIG. 8, left). A similar trend was observed in patients with $C_{max}$ in the range 0-1000 ng/ml (FIG. 8, right).

None of the patients with an AUC<2011 ng*hr/ml or $C_{max}$<442 ng/ml experienced a decrease in NLR during this period. In contrast, 6/13 (46%) of patients with an AUC between 2011-8000 ng*hr/ml and 6/9 (67%) of patients with a Cmax between 442-1000 ng/ml experienced a decrease in NLR. The average change in NLR for patients with an AUC between 3740-8000 ng*hr/ml was −6.1%, representing a decrease in NLR. The average change in NLR for patients with a Cmax between 595-836 ng/ml was −4.4%, representing a decrease in NLR.

Figure 9:
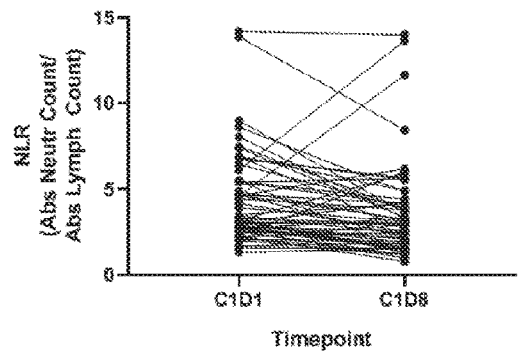
FIG. 9. Dosing for 8 days with relacorilant+nab-paclitaxel reduces the NLR in solid tumor patients.

Relacorilant+Nab-Paclitaxel Normalizes the NLR Patients with Advanced Solid Tumor The NLR was measured at cycle 1 day 1 and day 8 of the relacorilant+nab-paclitaxel combination. 35 of 59 patients with advanced solid tumors had an NLR>3 at cycle 1 day 1. A significant (p=0.012) decrease in the NLR was observed after 8 days of dosing with relacorilant+nab-paclitaxel was observed in these 59 patients (FIG. 9). The average NLR on cycle 1 day 1 was 4.4 and was reduced to 3.6 on cycle 1 day 8.

Figure 10:
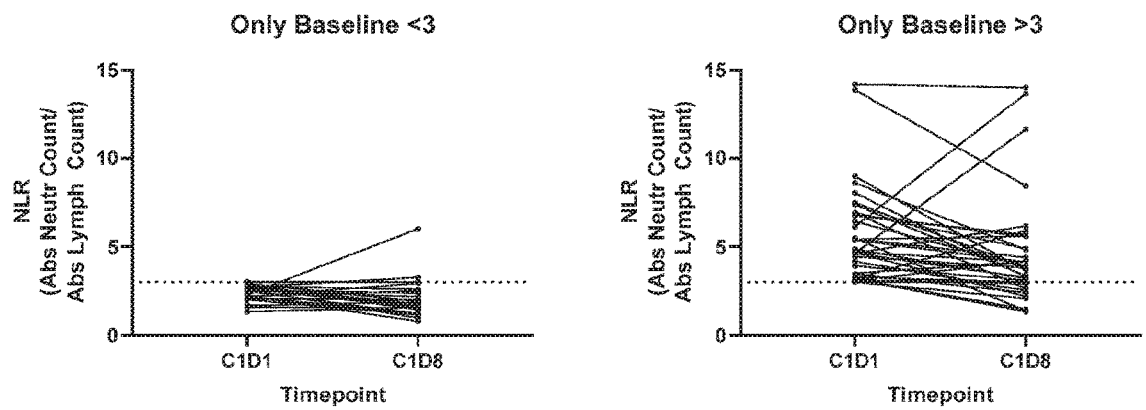
FIG. 10. NLR changes in patients with advanced solid tumors and baseline NLR less than or equal to 3 (shown on the graph at left) as compared to NLR changes in patients with advanced solid tumors and baseline NLR greater than 3 (shown on the graph at right).

The NLR reduction was predominantly observed in patients with a baseline NLR>3. For the 24 patients with baseline NLR≤3, there was no significant change in NLR during the 8 day dosing period (FIG. 10, left). For the 35 patients with baseline NLR>3, there was a significant decrease (p=0.029) in NLR over the same dosing period (FIG. 10, right). For the patients with baseline NLR>3, the average of 5.6 on cycle 1 day was reduced to 4.5 on cycle 1 day 8.

Relacorilant+Nab Paclitaxel Reduces the NLR in an Ovarian Cancer Patient Experiencing a Complete Response Patient 038-4004 was a 57 year-old woman with recurrent Stage IIIB high-grade papillary serous ovarian cancer that was initially sensitive to treatment with paclitaxel+cisplatin. Her disease then recurred 3 years later and progressed after two subsequent lines of therapies (gemcitabine+carboplatin+bevacizumab and liposomal doxorubicin). The patient experienced reduction in tumor marker CA125 (1225.9 to 63.7 units/mL) after the first cycle of study treatment with relacorilant+nab-paclitaxel, and achieved complete response radiographically after two cycles of treatment. This patient discontinued study treatment due to toxicity after 5 months and her disease progressed after 8 months from initiation of study treatment.

During the 7-day relacorilant lead in, patient 038-4004 experienced a decrease in the NLR from 5.5 to 2.5 (FIG. 11). This represents an NLR change of −46%. NLR above 5 is consistently interpreted as "high," and NLR below 2.5 is consistently interpreted as "low" in oncology studies assessing the predictive value of NLR on immuno-therapy or chemotherapy outcomes (Sacdalan, 2018; Goldstein, 2015). This represents and NLR change from baseline (CfB) of −55% (ie, a 55% decrease) during the relacorilant lead-in.

NLR Reduction is Associated with Tumors Response

The NLR changes were compared between patients with distinct categories of tumor response as defined by the RECIST criteria. Patients were grouped by RECIST criteria of progressive disease (PD), stable disease (SD), and partial or complete response (PR/CR). Patients with PR/CR trended toward a more pronounced reduction in NLR in the first 8 or 15 days of cycle 1 (FIG. 12). In that patients experiencing progressive disease, the average NLR at day 15 was 48% higher than the NLR on day 1. In the patients experiencing partial or complete response, the average NLR at day 15 was 25% lower than the NLR on day 1. In conclusion, NLR reductions are associated with more pronounced response to relacorilant+nab-paclitaxel.

CONCLUSIONS

Decreased NLR predicts better outcomes for cancer patients treated with chemotherapy or immunotherapy. Relacorilant, a selective GR antagonist, inhibits the NLR increase caused by prednisone. Patients with relacorilant pharmacokinetic parameters in the optimal range were more likely to experience a decrease in NLR after 7 days of dosing with relacorilant alone. Relacorilant+nab-paclitaxel decreased the NLR in cancer patients with elevated baseline NLR. Relacorilant had no effect on the NLR in healthy subjects or cancer patients with a baseline NLR in the normal range. This observation has not been described previously. Further, this observation may indicate that elevated cortisol activity is partially responsible for elevated NLR in advanced solid tumor patients.

The results disclosed herein demonstrate that relacorilant administration can reduce NLR in cancer patients, and can normalize NLR in cancer patients. It is believed that such NLR reduction in cancer patients having elevated NLR provides therapeutic benefit to such patients.

All patents, patent publications, patent applications, and publications cited in this application are hereby incorporated by reference herein in their entireties as if each individual patent, patent publication, patent application, or publication were specifically and individually indicated to be incorporated by reference. In addition, although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

We claim:

1. A method of reducing the neutrophil-to-lymphocyte ratio (NLR) by at least 10% as compared to the baseline NLR in a cancer patient suffering from pancreatic cancer, ovarian cancer, or having an advanced solid tumor or metastatic tumor and having a baseline NLR greater than 3, said baseline NLR being determined from a blood sample obtained from said patient prior to administration of a cancer treatment to the patient;

Wherein NLR is determined by a) measuring the absolute neutrophil count obtained from a blood sample obtained from said cancer patient to determine a value of said absolute neutrophil count, b) measuring the absolute lymphocyte count obtained from said blood sample obtained from said cancer patient to determine a value of said absolute neutrophil count, and c) dividing the value of said absolute neutrophil count by the value of said absolute lymphocyte count, wherein NLR is the quotient resulting from said dividing;

the method comprising:

administering an effective amount of the nonsteroidal selective glucocorticoid receptor antagonist (GRA) relacorilant, (R)-(1-(4-fluorophenyl)-6-((1-methyl-1H-pyrazol-4-yl)sulfonyl)-4,4a,5,6,7,8-hexahydro-1H-pyrazolo[3,4-g]isoquinolin-4a-yl)(4-(trifluoromethyl)pyridin-2-yl)methanone, which has the structure:

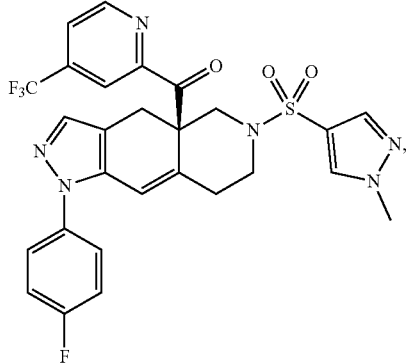 [SMILES: Cn1cc(S(=O)(=O)N2CCC3=Cc4c(cnn4-c4ccc(F)cc4)C[C@]3(C(=O)c3cc(C(F)(F)F)ccn3)C2)cn1]

and administering an effective amount of a cancer treatment comprising a taxane chemotherapeutic, to said cancer patient, whereby the NLR of said cancer patient determined after administration of relacorilant and said cancer treatment is reduced by at least 10% as compared to the baseline NLR.

2. The method of claim 1, wherein said administration of said cancer treatment and administration of relacorilant is effective to reduce the tumor load of the patient.

3. The method of any of claim 1, wherein said neutrophil-to-lymphocyte ratio (NLR) of said cancer patient is reduced to about 3 or less.

4. The method of claim 1, wherein the method further comprises administration of an immunotherapeutic agent.

5. The method of claim 4, wherein the immunotherapeutic agent comprises an antibody directed against a protein target selected from PD-1, PD-L1, CTKA4, LAG3, B7-H3, B7-H4, OX-40, CD137, and TIM3.

6. The method of claim 1, wherein said reducing NLR by at least 10% as compared to said baseline NLR is effective to enhance the response to cancer treatment in a cancer patient receiving cancer treatment and having a neutrophil-to-lymphocyte ratio of greater than 3, wherein said enhancing is as compared to the response in the absence of the present method, the method comprising:

administering an effective amount of a nab-paclitaxel and an effective amount of a relacorilant to said cancer patient, whereby the cancer patient's NLR is reduced and the cancer patient's response to cancer treatment is enhanced.

7. The method of claim 6, wherein the patient exhibits a partial response to the cancer treatment and GRA treatment, wherein said partial response is an improvement as compared to the patient's response to the cancer treatment alone, whereby the cancer patient's NLR is reduced and the cancer patient's response to cancer treatment is enhanced.

8. The method of claim 6, wherein the patient exhibits a complete response to the cancer treatment and GRA treatment, wherein said complete response is an improvement as compared to the patient's response to the cancer treatment alone, whereby the cancer patient's NLR is reduced and the cancer patient's response to cancer treatment is enhanced.

* * * * *

UNITED STATES PATENT AND TRADEMARK OFFICE
CERTIFICATE OF CORRECTION

PATENT NO. : 12,440,487 B2
APPLICATION NO. : 17/768844
DATED : August 5, 2025
INVENTOR(S) : Andrew Greenstein et al.

Page 1 of 1

It is certified that error appears in the above-identified patent and that said Letters Patent is hereby corrected as shown below:

In the Claims

Column 44 Line 23, Claim 5: please delete "CTKA4," and insert --CTLA4,--.

Signed and Sealed this
Twenty-fifth Day of November, 2025

John A. Squires
*Director of the United States Patent and Trademark Office*